US012744590B2

(12) United States Patent
Kuang et al.

(10) Patent No.: US 12,744,590 B2
(45) Date of Patent: Sep. 22, 2026

(54) COMMUNICATION APPARATUS AND BASE STATION

(71) Applicant: Panasonic Intellectual Property Corporation of America, Torrance, CA (US)

(72) Inventors: Quan Kuang, Langen (DE); Hidetoshi Suzuki, Kanagawa (JP); Akihiko Nishio, Osaka (JP); Ming-Hung Tao, Frankfurt am Main (DE); Hongchao Li, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 665 days.

(21) Appl. No.: 17/922,324

(22) PCT Filed: Mar. 10, 2021

(86) PCT No.: PCT/EP2021/055976
§ 371 (c)(1),
(2) Date: Oct. 28, 2022

(87) PCT Pub. No.: WO2021/219283
PCT Pub. Date: Nov. 4, 2021

(65) Prior Publication Data

US 2023/0179294 A1 Jun. 8, 2023

(30) Foreign Application Priority Data

Apr. 30, 2020 (EP) .................................... 20172473

(51) Int. Cl.
*H04B 7/185* (2006.01)
*H04B 7/204* (2006.01)

(52) U.S. Cl.
CPC ..... *H04B 7/18541* (2013.01); *H04B 7/18513* (2013.01); *H04B 7/2041* (2013.01)

(58) Field of Classification Search
CPC ........... H04B 7/18541; H04B 7/18513; H04B 7/2041; H04B 7/18517
See application file for complete search history.

(56) References Cited

U.S. PATENT DOCUMENTS

2003/0096574 A1 5/2003 Anderson et al.
2010/0234042 A1 9/2010 Chan et al.
(Continued)

FOREIGN PATENT DOCUMENTS

JP 2018520536 A 7/2018
JP 2019533338 A 11/2019

OTHER PUBLICATIONS

CMCC, "Considerations on mobility for LEO," R2-1905933, Agenda item: 11.6.4.1.2, 3GPP TSG-RAN WG2 Meeting #106, Reno, USA, May 13-17, 2019. (2 pages).
(Continued)

*Primary Examiner* — Fred A Casca
(74) *Attorney, Agent, or Firm* — Seed Intellectual Property Law Group LLP

(57) ABSTRACT

The techniques disclosed herein feature a user equipment (UE), a base station, and methods for a UE and abase station. The UE comprises a transceiver which, in operation receives coverage area information indicating a coverage area of at least one candidate satellite beam relative to a satellite location of at least one satellite generating, respectively, the at least one candidate satellite beam; and circuitry which, in operation, determines, based on the received coverage area information, ephemeris data of the at least one satellite generating the at least one candidate satellite beam, and a location of the user equipment, a target satellite beam for switching out of the at least one candidate satellite beam and
(Continued)

a switching timing for switching to the target satellite beam, and controls the transceiver to perform switching to the determined target satellite beam at the determined switching timing.

6 Claims, 12 Drawing Sheets

(56) References Cited

U.S. PATENT DOCUMENTS

| | | | | |
|---|---|---|---|---|
| 2016/0323032 | A1 | 11/2016 | Ulupinar et al. | |
| 2016/0323800 | A1* | 11/2016 | Ulupinar | H04B 7/1851 |
| 2017/0180038 | A1 | 6/2017 | Oza et al. | |
| 2018/0343052 | A1 | 11/2018 | Lv et al. | |
| 2022/0078733 | A1* | 3/2022 | Li | H04B 17/364 |
| 2022/0086671 | A1* | 3/2022 | Hong | H04W 16/28 |
| 2022/0201482 | A1* | 6/2022 | Ferdi | H04L 9/3236 |

OTHER PUBLICATIONS

CMCC, "Using beam footprint information for GEO mobility," R2-1912940 *Revision of R2-1909439*, Agenda item: 6.6.4.1, 3GPP TSG-RAN WG2 Meeting #107bis, Chongqing, China, Oct. 14-18, 2019. (3 pages).

Extended European Search Report, dated Oct. 23, 2020, for European Patent Application No. 20172473.9-1205. (15 pages).

Hughes, "Satellite Ephemeris Data and their Use for Handover Decisions between Satellites," R2-1818050, Agenda Item: 11.6., 3GPP TSG RAN 2 Meeting #104, Spokane, USA, Nov. 12-16, 2018. (5 pages).

International Search Report, mailed Jun. 2, 2021, for International Patent Application No. PCT/EP2021/055976. (5 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.3.0, Sep. 2018. (96 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019. (140 pages).

3GPP, "3rd Generation Partnership Project; Technical Specification Group Radio Access Network; Study on New Radio (NR) to support non-terrestrial networks (Release 15)," 3GPP TR 38.811 V15.2.0, Sep. 2019. (126 pages).

3GPP, "3rd Generation Partnership Project; Technical Specification Group Radio Access Network; Study on Scenarios and Requirements for Next Generation Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

CMCC, "Utilization of beam footprint information for mobility management," R2-1904318, Revision of R2-1818133, Agenda item: 11.6.4.1.1, 3GPP TSG-RAN WG2 Meeting #105bis, Xi'an, China, Apr. 8-12, 2019. (3 pages).

* cited by examiner

Transparent satellite

Regenerative satellite

Essential Parameters for Ephemeris

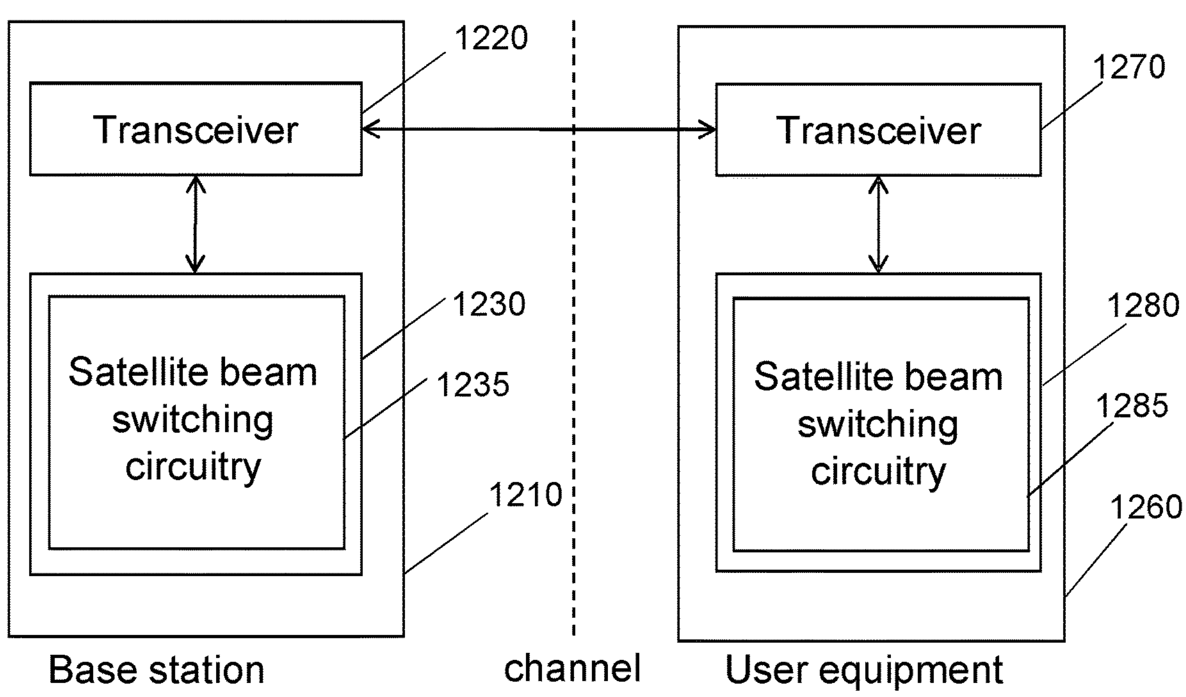
Fig. 12
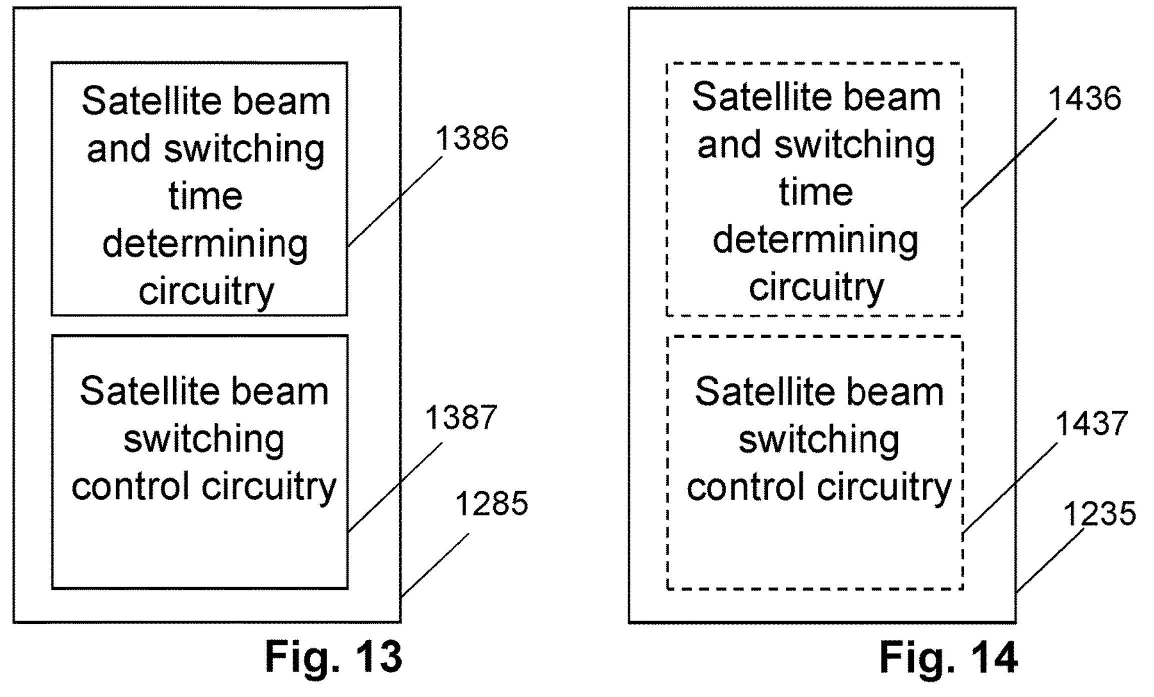
Fig. 13
Fig. 14

Transceiver

1270 circuitry

1280

2780

2760

GNSS module

COMMUNICATION APPARATUS AND BASE STATION

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Terni Evolution (LTE) and LTE Advanced (LTE-A).

For systems like LTE, LTE-A, and NR, further modifications and options may facilitate efficient operation of the communication system as well as particular devices pertaining to the system.

SUMMARY

One non-limiting and exemplary embodiment facilitates efficient handover and beam switching in non-terrestrial networks.

In an embodiment, the techniques disclosed herein feature a user equipment comprising a transceiver which, in operation receives coverage area information indicating a coverage area of at least one candidate satellite beam relative to a satellite location of at least one satellite transmitting, respectively, the at least one candidate satellite beam; and circuitry which, in operation, determines, based on the received coverage area information, ephemeris data of the at least one satellite transmitting the at least one candidate satellite beam, and a location of the user equipment, a target satellite beam for switching out of the at least one candidate satellite beam and a switching timing for switching to the target satellite beam, and controls the transceiver to perform switching to the determined target satellite beam at the determined switching timing.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

FIG. 12 is a block diagram showing a base station and a user equipment (UE);

FIG. 13 is a block diagram showing satellite beam switching circuitry of a user equipment;

FIG. 14 is a block diagram showing satellite beam switching circuitry of a base station;

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
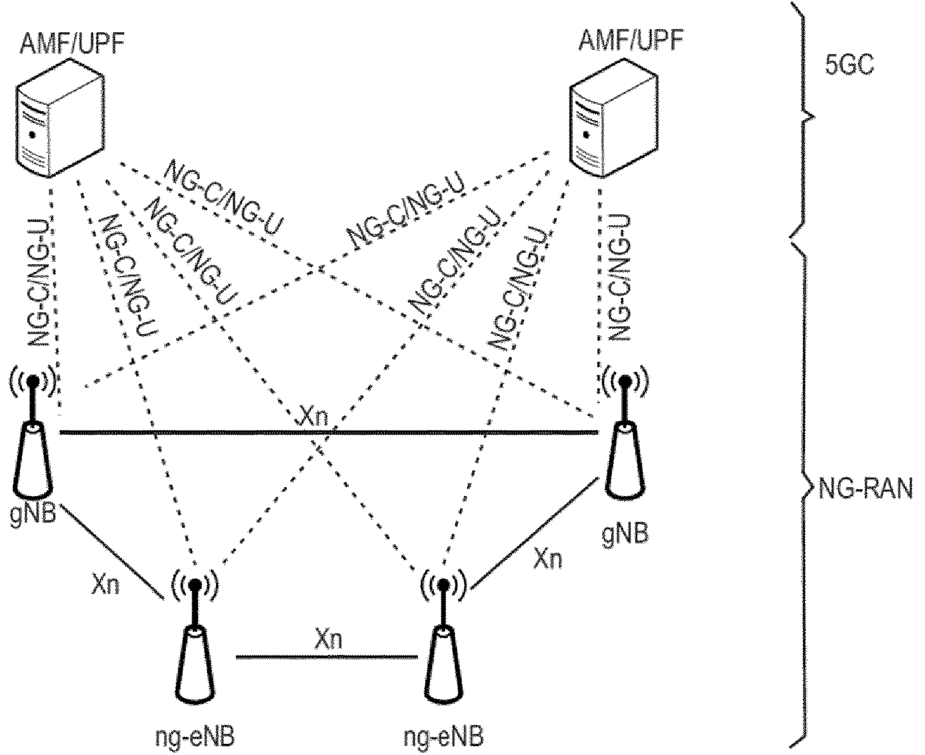
FIG. 1 shows an exemplary architecture for a 3GPP NR system.

Among other things, the overall system architecture assumes an NG-RAN (Next Generation-Radio Access Network) that comprises gNBs (gNodeB), providing the NG-radio access user plane (SDAP/PDCP/RLC/MAC/PHY) and control plane (RRC, Radio Resource Control) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 2:
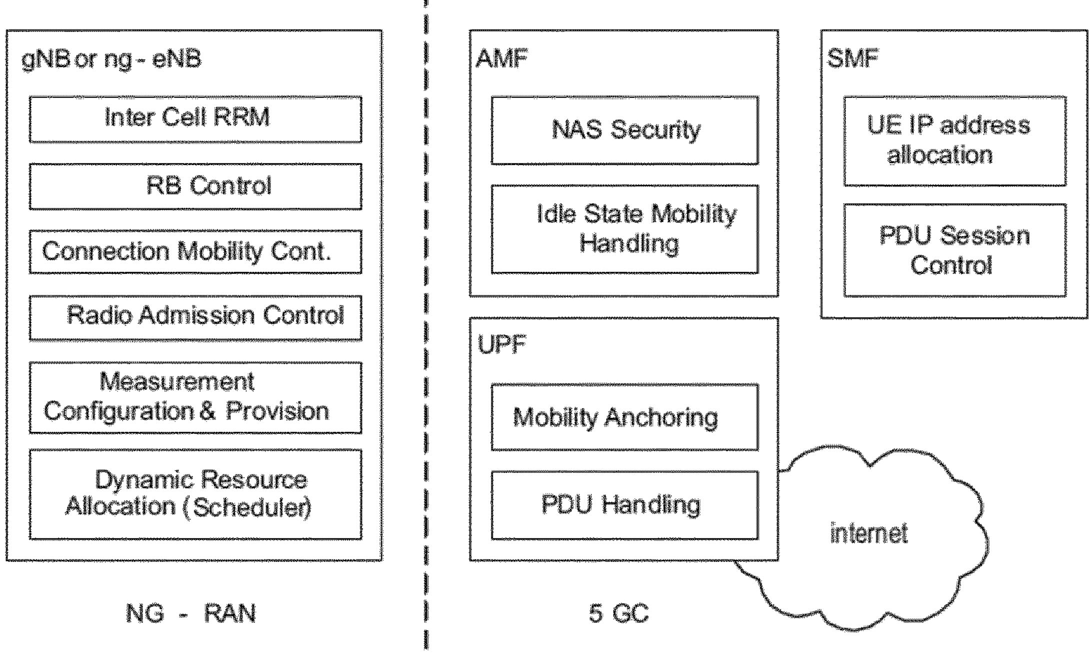
FIG. 2 is a schematic drawing which shows functional split between NG-RAN and 5GC.

FIG. 2 illustrates functional split between NG-RAN and 5GC. NG-RAN logical node is a gNB or ng-eNB (next generation eNB). The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity; and
- Tight interworking between NR and E-UTRA.

The Access and Mobility Management Function (AMF) hosts the following main functions:

- Non-Access Stratum, NAS, signaling termination;
- NAS signaling security;
- Access Stratum, AS, Security control;
- Inter Core Network, CN, node signaling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing; and

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g., packet filtering, gating, UL/DL rate enforcement;

Uplink Traffic verification (SDF to QoS flow mapping); and

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS; and

Downlink Data Notification.

RRC Connection Setup and Reconfiguration Procedures

Figure 3:
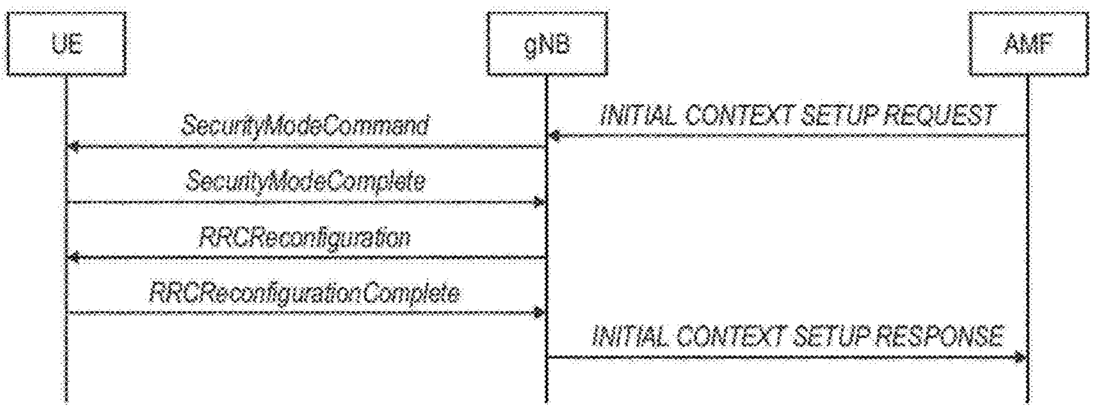
FIG. 3 is a sequence diagram for RRC connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
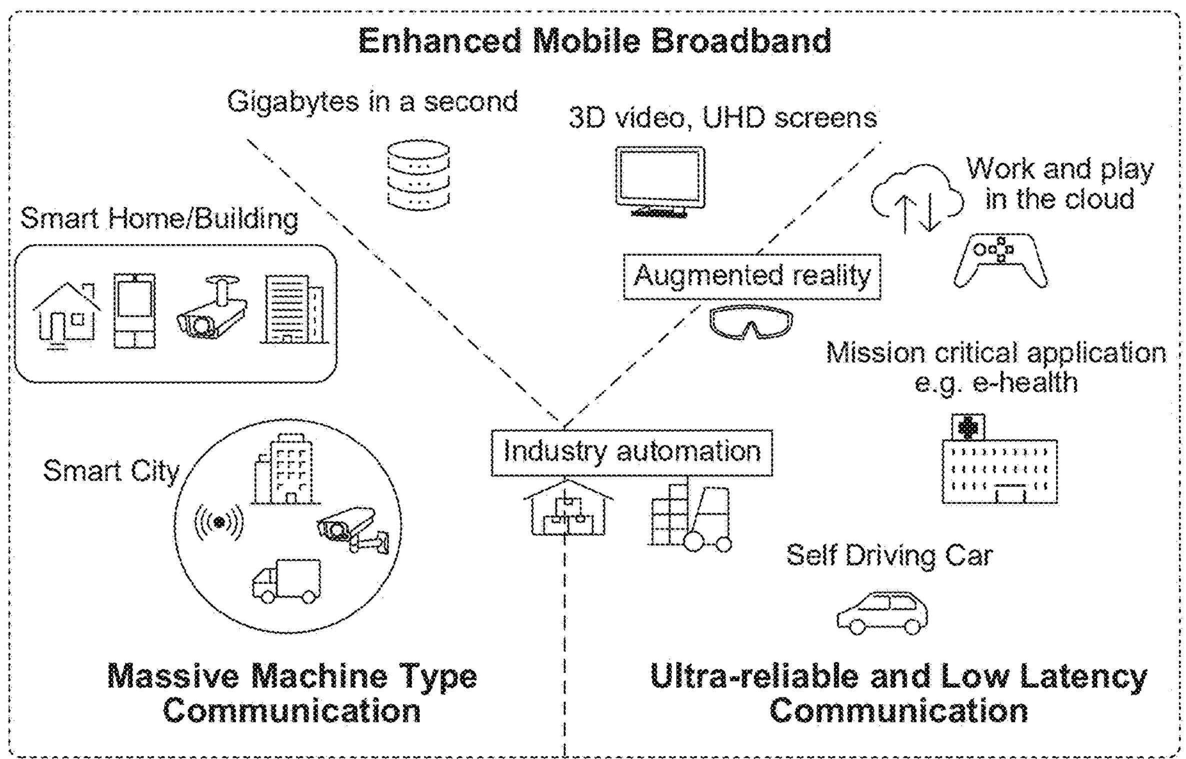
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., FIG. 2 of ITU-R M.2083).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI (Downlink Control Information) formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots. I.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
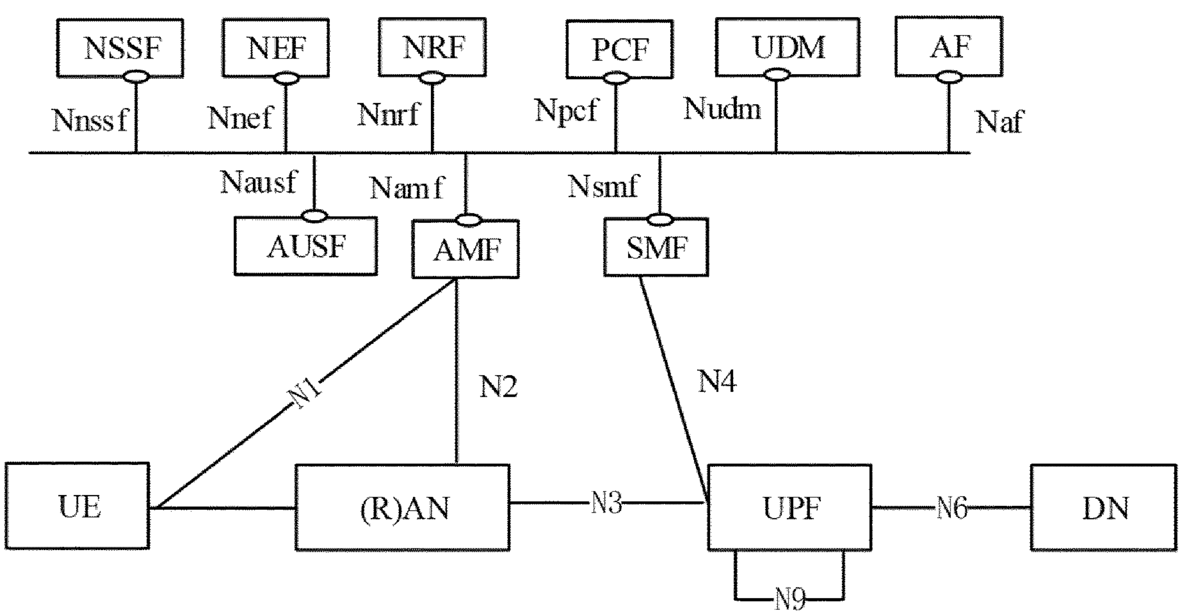
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

A terminal is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node or scheduling node, e.g., forming a part of the network for providing services to terminals. A base station is a network node, which provides wireless access to terminals.

RRC States

In wireless communication systems including NR, a device or communication apparatus (e.g., UE) can be in different states depending on traffic activity. In NR, a device can be in one of three RRC states, RRC_IDLE, RRC_CONNECTED, and RRC_INACTIVE. The first two RRC states, RRC_IDLE and RRC_CONNECTED, are similar to the counterparts in LTE, while RRC_INACTIVE is a new state introduced in NR and not present in the original LTE design. There are also core network states, CN_IDLE and CN_CONNECTED, depending on whether the device has established a connection with the core network or not.

In RRC_IDLE, there is no RRC context—that is, the parameters necessary for communication between the device and the network—in the radio-access network and the device does not belong to a specific cell. From a core network perspective, the device is in the CN_IDLE state. No data transfer may take place as the device sleeps most of the time to reduce battery consumption. In the downlink, devices in idle state periodically wake up to receive paging messages, if any, from the network. Mobility is handled by the device through cell reselection. Uplink synchronization is not maintained and hence the only uplink transmission activity that may take place is random access, e.g., to move to a connected state. As part of moving to a connected state, the RRC context is established in both the device and the network.

In RRC_CONNECTED, the RRC context is established and all parameters necessary for communication between the device and the radio-access network are known to both entities. From a core network perspective, the device is in the CN_CONNECTED state. The cell to which the device belongs is known and an identity of the device, the Cell Radio-Network Temporary Identifier (C-RNTI), used for signaling purposes between the device and the network, has been configured. The connected state is intended for data transfer to/from the device, but discontinuous reception (DRX) can be configured to reduce device power consumption. Since there is an RRC context established in the gNB in the connected state, leaving DRX and starting to receive/transmit data is relatively fast as no connection setup with its associated signaling is needed. Mobility is managed by the radio-access network, that is, the device provides neighboring-cell measurements to the network which commands the device to perform a handover when relevant. Uplink time alignment may or may not exist but need to be established using random access and maintained for data transmission to take place.

In LTE, only idle and connected states are supported. A common case in practice is to use the idle state as the primary sleep state to reduce the device power consumption. However, as frequent transmission of small packets is common for many smartphone applications, the result is a significant amount of idle-to-active transitions in the core network. These transitions come at a cost in terms of signaling load and associated delays. Therefore, to reduce the signaling load and in general reduce the latency, a third state is defined in NR, the RRC_INACTIVE state.

In RRC_INACTIVE, the RRC context is kept in both the device and the gNB. The core network connection is also kept, that is, the device is in CN_CONNECTED from a core network perspective. Hence, transition to connected state for data transfer is fast. No core network signaling is needed. The RRC context is already in place in the network and idle-to-active transitions can be handled in the radio-access network. At the same time, the device is allowed to sleep in a similar way as in the idle state and mobility is handled through cell reselection, that is, without involvement of the network. Accordingly, the mobility of the communication apparatus or device is device controlled rather than network controlled, and the communication apparatus is capable of contacting the network through random access. Thus, RRC_INACTIVE can be seen as a mix of the idle and connected states (for further details, see E. Dahlman, et al., 5GNR: The Next Generation Wireless Access Technology, 1st Edition, sections 6.5.1 to 6.5.3).

Non-Terrestrial Networks (NTNs)

In 3GPP, NR-based operation in a non-terrestrial network (NTN) is studied and described (see, e.g., 3GPP TR 38.811, Study on New Radio (NR) to support non-terrestrial networks, version 15.2.0, and 3GPP TR 38.821, Solutions for NR to support non-terrestrial networks, version 16.0.0).

Thanks to the wide service coverage capabilities and reduced vulnerability of space/airborne vehicles to physical attacks and natural disasters, NTNs may foster the rollout of NR service in unserved areas that cannot be covered by terrestrial NR networks (for instance isolated or remote areas, on board aircraft or vessels) and unserved (for instance suburban and rural areas). Further, NTNs may reinforce NR service reliability by providing service continuity for passengers on moving platforms or ensuring service availability anywhere, especially for critical communication.

The benefits relate to either non-terrestrial networks operating alone or to integrated terrestrial and non-terrestrial networks, which may impact coverage, user bandwidth, system capacity, service reliability or availability.

A non-terrestrial network refers to a network, or segment of networks using RF resources on board of a satellite, for instance. NTNs typically feature the following system elements: an NTN terminal, which may refer to a 3GPP UE or a terminal specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the gateway and space/airborne platform.

Figure 6:
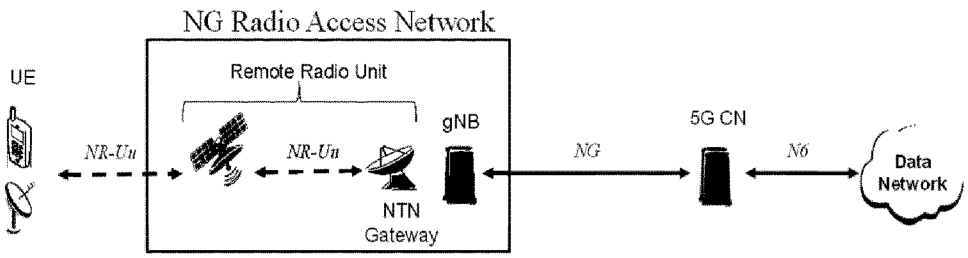
FIG. 6 illustrates a scenario of a non-terrestrial network (NTN), wherein a transmission between a terminal is performed via a remote radio unit including a satellite and an NTN gateway.

FIG. 6 illustrates a scenario of a non-terrestrial network, wherein a transmission between a terminal (UE) is performed via a remote radio unit including a satellite and an NTN gateway. A gNB is located at the gateway as a scheduling device. The satellite payload implements frequency conversion and radiofrequency amplifier in both uplink and downlink direction. Hence, the satellite repeats the NR radio interface from the feeder link (between the NTN gateway and the satellite) to the service link (between the satellite and the UE) and vice versa. A satellite in this configuration is referred to as a transparent satellite.

Figure 7:
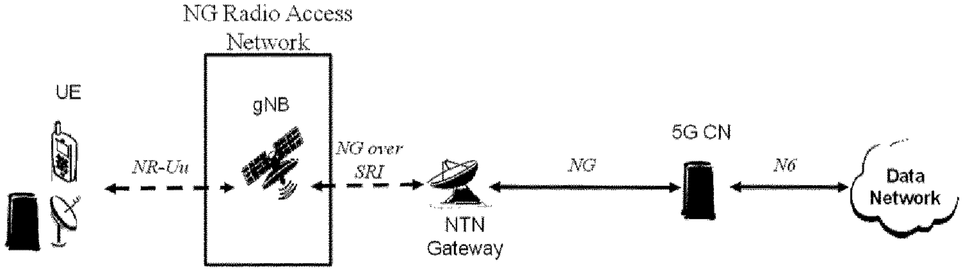
FIG. 7 illustrates a scenario of a non-terrestrial network, wherein a transmission between a terminal is performed via a satellite including a gNB as a scheduling device.

FIG. 7 illustrates a scenario of a non-terrestrial network, wherein a transmission between a terminal (UE) is performed via a satellite including a gNB as a scheduling device. A satellite in this configuration is referred to as a regenerative satellite.

In NTN, there may be different kinds of platforms, including satellites and UAS (Unmanned Aerial System) platforms, examples of which are listed in Table 1 (corresponding Table 4.1-1 of 3GPP TR 38.821, see also 3GPP TR 38.821, Section 4.1, Non-Terrestrial Networks overview):

TABLE 1

| Types of NTN platforms | | | |
|---|---|---|---|
| Platforms | Altitude range | Orbit | Typical beam footprint size |
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including High Altitude Platform Station (HAPS)) | 8-50 km (20 km for HAPS) | | 5-200 km |
| High Elliptical Orbit (HEO) satellite | 400-50000 km | Elliptical around the earth | 200-3500 km |

For LEO, MEO, and HEO satellites, which do not keep a their position fixed with respect to a given earth point, a satellite beam, which corresponds to a cell or PCI (Physical Cell ID) or to an SSB (Synchronization Signal Block) beam of the NR wireless system may be moving over the earth.

Figure 8:
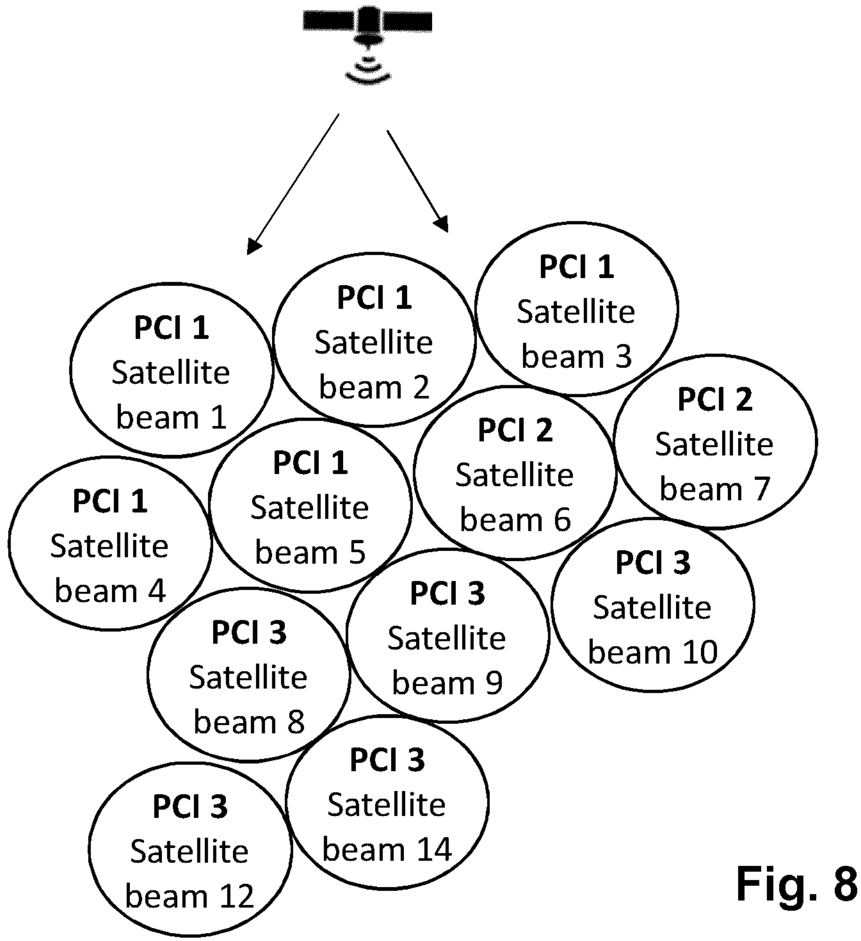
FIG. 8 illustrates a mapping of one cell (PCI) to multiple satellite beams.
Figure 9:
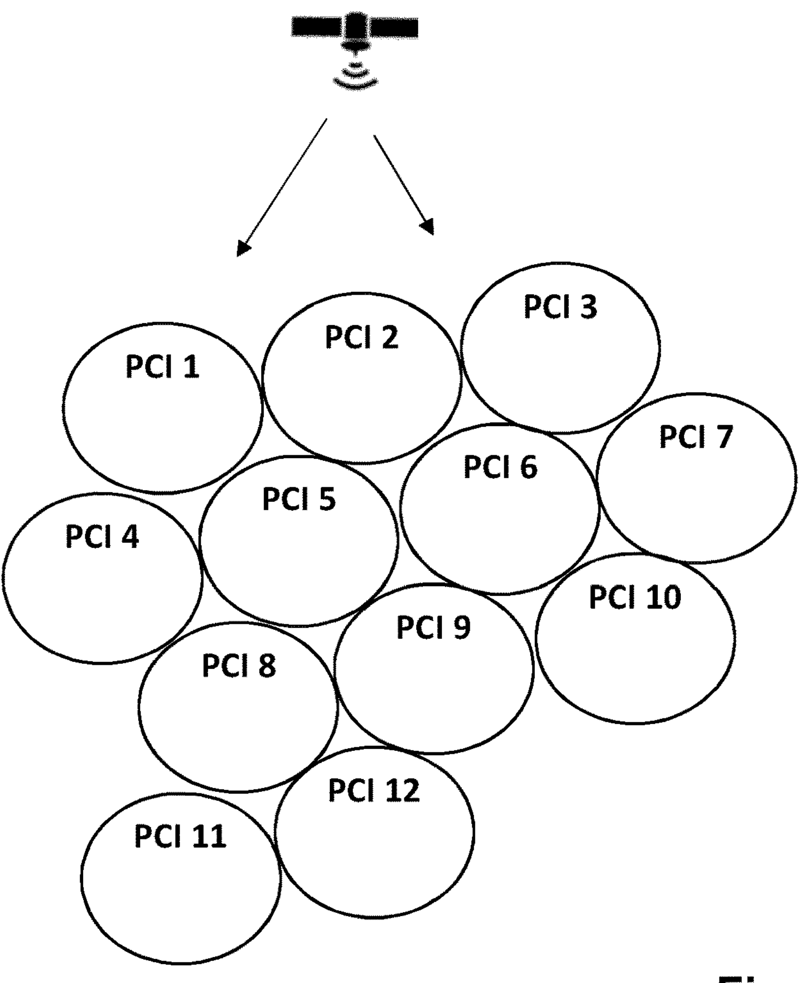
FIG. 9 illustrates a mapping of one cell (PCI) to a single satellite beam.

Regarding a mapping between satellite beam, NR cell, and NR SSB beam, different deployment options, e.g., options a and b shown in FIGS. 8 and 9, may be considered. In accordance with deployment option a illustrated in FIG. 8, one cell (corresponding to a PCI has multiple satellite beams (e.g., the same PCI for multiple satellite beams), whereas in accordance with deployment option b shown in FIG. 9, one cell corresponds to one satellite beam (there is one PCI per satellite beam).

A satellite beam can consist of one or more SSB beams. For instance, one satellite beam can be mapped to one SSB beam, e.g., there is a one-to one correspondence between satellite beams and SSB beams. Therein, the beam used to transmit the NR Synchronization Signal Block) is referred to as SSB beam. One NR cell (PCI) can have up to L SSB beams, where L can be 4, 8, or 64, depending on the band. The SSB beam can be used as a reference beam for beam management in NR.

Figure 10:
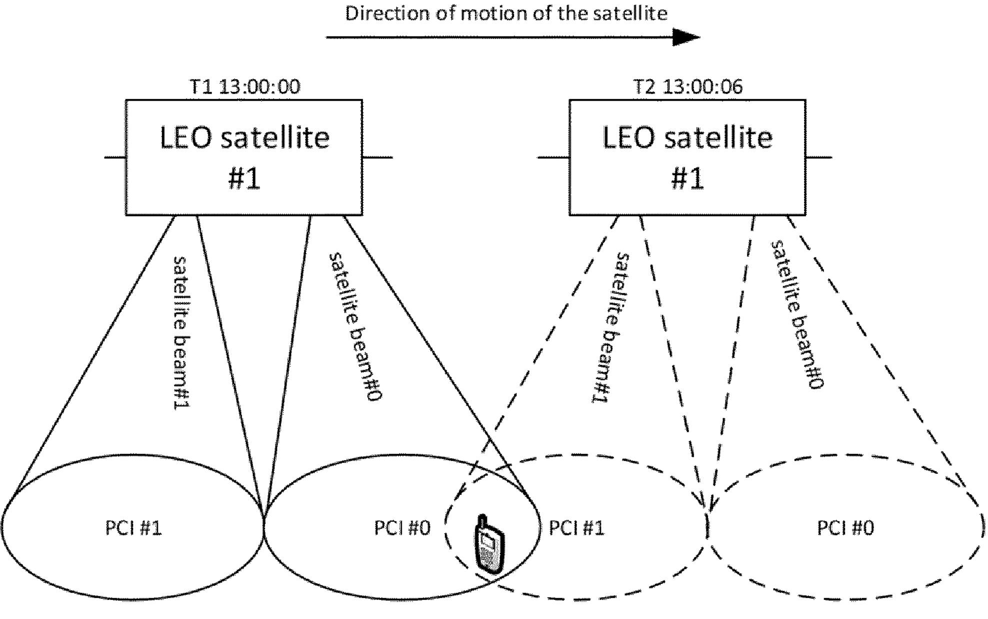
FIG. 10 illustrates an earth moving cell scenario in an NTN.

A NTN scenario that provides cells which are continuously moving on the Earth (e.g., a LEO, MEO, or HEO based NTN), is referred to as an earth moving cell scenario. An earth moving cell scenario is illustrated in FIG. 10. The continuous cell motion on the Earth is due to the operation where the satellite beam is fixed with respect to the NTN platform. Therefore, the footprint of the cell, which may correspond to several satellite beams or one satellite beam in accordance with above-described deployment options a and b, slides on the earth surface with the motion of the NTN platform (e.g., a LEO satellite as shown in FIG. 10).

Figure 11:
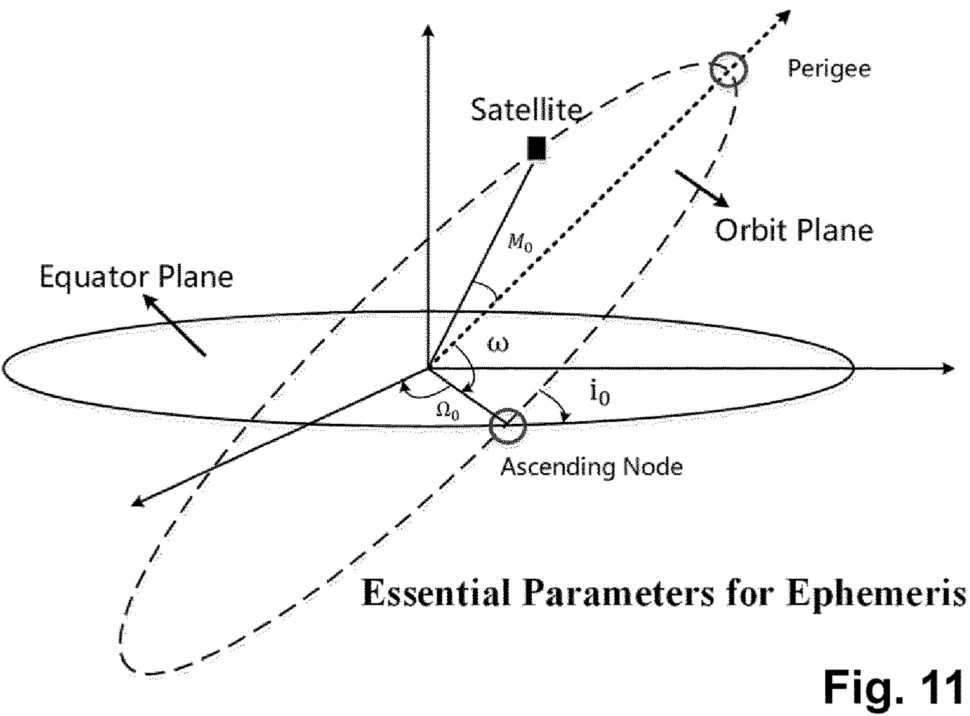
FIG. 11 illustrates parameters of ephemeris.

Information about the orbital trajectories of satellites are contained in ephemeris data (or "satellite ephemeris data"). There are different possible representations of ephemeris data, wherein one possibility is to use orbital parameters such as semi-major axis, eccentricity, inclination, right ascension of the ascending node, argument of periapsis, mean anomaly at a reference point in time, and the epoch. The first five parameters can determine an orbital plane (orbital plane parameters), and the other two parameters are used to determine exact satellite location at a time (satellite level parameters). Orbital plane parameters and satellite level parameters are listed in Table 2 and illustrated in FIG. 11 (see also section 7.3.6.1, Representation of Complete Ephemeris Data, of 3GPP TR 38.821 V16.0.0). Another possible option is to provide coordinates of the satellite location (x,y,z), a velocity vector (vx,vy,vz) and a reference point in time.

TABLE 2

| Elements of Ephemeris | | |
|---|---|---|
| Orbital plane parameters | $\sqrt{a}$ | Square root of semi major axis a (semi-major axis) |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

Accordingly, a representation of needs seven parameters (e.g., double-precision floating point numbers) and possibly some overhead. In an NTN system, several satellites may share a common orbital plane. In such cases, some ephemeris data may be provided for orbital planes rather than for single satellites, to reduce the amount of data. The ephemeris data per orbital plane may be stored in the UE or in the UE's Subscriber Identity Module (SIM).

However, for networks with many satellites, the size of ephemeris data can be rather large. Accordingly, rather than storing the ephemeris data, the ephemeris data may at least partially be transmitted from a gNB.

For instance, satellite level orbital parameters for all satellites that may serve a UE may be stored in the UE or in the SIM, and the ephemeris data for each satellite is linked to a satellite ID or index. The satellite ID or index of the serving satellite may then be broadcasted in system information so that the UE can find the corresponding ephemeris data in the UE's SIM or storage.

Alternatively, satellite level orbital parameters of the serving satellite may be broadcasted in system information and UE will derive the position coordinates of the serving satellite. The ephemeris data of the neighboring satellites can also be provided to UE via system information or dedicated RRC signalling. In case the baseline orbital plane parameters are provisioned in the UE or SIM, it may be sufficient to broadcast the mean anomaly at a reference point in time and the epoch need to be broadcasted to UE, so that overhead can be reduced.

Due to high speed of satellite movement relative to a fixed position on earth frequent SSB switching, e.g., for deployment option a, or frequent handover (HO), e.g., for deployment option b, may occur. For instance, in a reference scenario, am NTN LEO cell ground diameter may be 50 km, and a satellite ground speed may be 7.56 km/s. In this case, the stationary UE would need to perform HO every 6.61 seconds.

In NR terrestrial networks, target cells and/or SSB beams are typically selected based on measuring reference signals (RS) from neighboring cells/beams, and reporting the measurement (e.g., Reference Signal Received Power (RSRP)) to the gNB. Then the target cell or target SSB beam is indicated to the UE, e.g., via RRC signaling (for HO) or via MAC/DCI signaling (for beam switching).

However, if the same RS measurement based mechanism for SSB beam switching or HO is also used for NTN moving cell scenarios, frequent RS measuring and reporting as well as cell or SSB beam indication may result in an increase in signaling overhead and UE power consumption. Furthermore, long propagation delay may possibly cause interruption of data transmission during HO and beam switching due to the large distance between the UE and the satellite or NTN platform.

The present disclosure provides techniques for serving cell and beam determination for non-terrestrial networks such as NR NTNs, wherein a serving cell and/or serving beam and the execution timing of the switching to the serving cell or beam as a target cell/beam are determined by information on a UE location and on how the ground cell/beam is moving.

Provided are a user equipment 1260 and a base station 1210, which are shown in FIG. 12. User equipment and base station communicate with each other over a wireless channel in a wireless communication system. For instance, the user equipment is a NR user equipment, and the base station may be a network node or scheduling node such as a NR gNB, in particular a gNB in an NTN NR system. However, the present disclosure is not limited to 3GPP NR and may also be applied to other wireless or cellular systems such as NTNs.

As shown in FIG. 12, the UE 1260 comprises a transceiver 1270 (or “UE transceiver”, to distinguish it from a transceiver in another type of communication apparatus) and circuitry 1280 (“UE circuitry”) such as processing and control circuitry. For instance, the UE circuitry 1280 comprises satellite beam switching circuitry 1285. FIG. 13 shows exemplary UE satellite beam switching circuitry 1285, which comprises satellite beam switching time and determining circuitry 1386 and satellite beam switching control circuitry 1387.

As further shown in FIG. 12, the base station 1210 comprises a transceiver 1220 (“base station transceiver”) and circuitry 1230 (“base station circuitry”). For instance, the base station circuitry 1230 may include satellite beam switching circuitry 1285. Exemplary satellite beam switching circuitry shown in FIG. 14 includes at least one of satellite beam switching time determining circuitry 1436 and satellite beam switching control circuitry 1437.

In some embodiments, the UE transceiver 1270, in operation, receives coverage area information indicating a coverage area of at least one candidate satellite beam relative one candidate satellite beam relative to a satellite location of at least one satellite generating, respectively, the at least one candidate satellite beam.

For instance, a first candidate satellite transmits first one or more beams, and a second satellite transmits second one or more beams different from the first beams transmitted by the first satellite.

The UE circuitry 1280 determines, based on
the received coverage area information,
ephemeris data of the at least one satellite generating the at least one candidate satellite beam, and
a location of the user equipment, a target satellite beam for switching out of the at least one candidate satellite beam. E.g., the UE circuitry 1280 selects the target satellite beam from among the candidate satellite beams, by performing calculations based on the coverage area information, ephemeris data, and the location of the UE. In addition, based on the coverage area information, ephemeris data, and the location of the UE, the UE circuitry 1280 determines, e.g., derives or calculates, a switching timing for switching to the target satellite beam.

The UE circuitry 1280, in operation, controls the UE transceiver 1270 to perform switching to the determined or selected target satellite beam at the determined switching timing. Accordingly, the UE switches to the determined target satellite beam at the determined switching timing.

Figure 15:
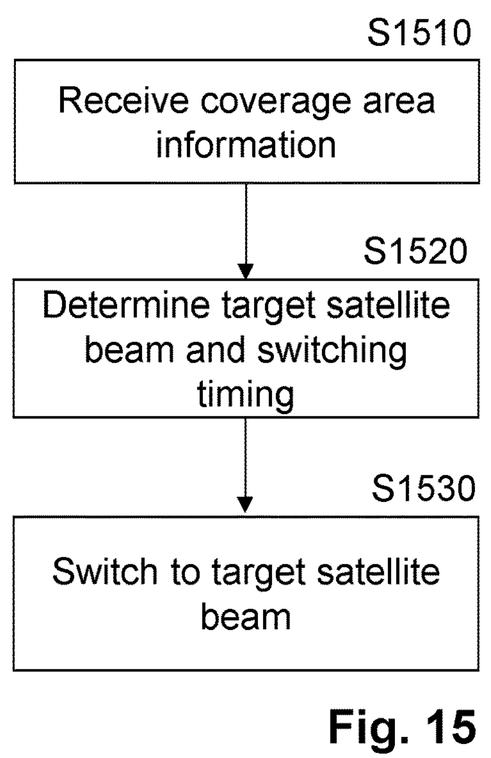
FIG. 15 is a block diagram showing steps of a communication method for a UE.

In correspondence with the above described UE, provided is a communication method to be performed by a UE. As shown in FIG. 15, the communication method (or “UE method”, for short) comprises a step S1510 of receiving coverage area information indicating a coverage area of at least one candidate satellite beam relative to a satellite location of at least one satellite generating, respectively, the at least one candidate satellite beam. E.g., the coverage area information is received from a base station. The UE method comprises step S1520 of determining a target satellite beam for switching out of the at least one candidate satellite beam and a switching timing for switching to the target satellite beam. Therein, the determination of the target satellite beam and of the switching timing are based on the received coverage area information, ephemeris data of the at least one satellite generating the at least one candidate satellite beam, and a location of the UE. The UE method further includes step S1530 of the UE performing switching to the determined target satellite beam at the determined switching timing.

The UE switches from a source serving beam to the determined target satellite beam. E.g., the UE 1260 performs communication with the base station 1210 (e.g., “source base station”) over a source serving beam in a source cell served by the base station. The source serving beam is the satellite beam over which the UE and the base station communicate before the satellite beam switching. When switching to the target satellite beam, the UE starts communication over the target satellite beam with the same base station (in the case of switching of the serving beam where the target serving cell is the same cell as the source serving cell) or with a target base station (in the case of a handover), and communicates over the target satellite beam after the determined switching timing. The communication on how the switching timing is defined, the communication of the UE over the target satellite beam may already be initiated prior to the switching timing (e.g., by sending a RACH preamble), depending on the type of signaling and on the definition of the switching timing. In general, the source serving cell may be a cell of a NTN (e.g., the source serving beam being a satellite beam) as well as a cell of a terrestrial base station.

As described above and illustrated in FIGS. 8 and 9, a single serving cell (PCI) may correspond to a plurality of satellite beams (deployment option a of FIG. 8), or there may be a one to one correspondence between serving cells and satellites (option b of FIG. 9). In this disclosure, satellite beam switching or switching to a target beam refers to both switching to another satellite beam within the same cell and switching to another cell, e.g., handover.

In accordance with the above-described embodiments of UE and UE method, the UE is provided, by receiving the coverage area information, with information on how a ground cell or beam area, is defined, e.g., a footprint coverage, possibly including at least one of the size and shape of the cell, and possible a location of the cell relative to satellite coordinates derivable from ephemeris data. Further, the satellite ephemeris data provides information on how the ground cell or beam is moving. Moreover, assuming that the UE knows its location, e.g., via GNSS (Global Navigation Satellite System), the UE knows which ground call or beam area will cover the UE's location at which timing. Accordingly, based on the information on how the ground cell or beam is defined and how it is moving as well as on the knowledge of its position, the UE determines a serving beam and possibly serving cell as the target beam or cell for switching to.

In some embodiments, the coverage area information is received in system information. For instance, the coverage area information, e.g., information on how the ground cell or beam is defined, is broadcast by SIB (system information block). In this case, a UE is enabled to use the coverage area information in any one of IDLE, INACTIVE, or CONNECTED modes. Accordingly, a mechanism is provided that can be used for IDLE and INACTIVE UEs as well as connected UEs. Alternatively, the coverage information may be received in UE-specific RRC signaling, to be available to CONNECTED UEs.

For IDLE and INACTIVE UEs, the selection of the target serving cell and/or beam need not be known to the base station. However, for CONNECTED UEs, the UE 1260 and the base station 1210 should have the same understanding. When communication, e.g., over physical uplink and/or downlink control and/or shared channels takes place, such common understanding may be necessary for the base station to know when to stop the communication with the UE. This common understanding may be provided by the UE reporting its location information to the base station 1210, e.g., periodically or aperiodically. Accordingly, in some embodiments, the UE transceiver 1270, in operation, transmits a location report indicating the location of the UE. As an alternative or in addition, the UE may report the switching timing, and possibly the target satellite beam, e.g., the selected cell or beam, directly. Accordingly, the UE transceiver 1270, in operation, transmits an indication of the determined target satellite beam and the determined switching timing. If the UE directly transmits the switching timing and, possibly, the target satellite beam, to the base station, the processing for gNB to determine the switching timing and possibly the target beam, may be avoided.

It should be further noted that the present disclosure is not limited to the UE receiving the coverage area information. For instance, the coverage area information may be stored in a UE's memory such as ROM (Read-only Memory) or the UE's SIM, thereby exempting the need for broadcasting the coverage area information via system information. However, considering big volume of data to be stored, the disclosure also includes the case where the coverage area information is partially stored in the UE or SIM, and a remaining part of the coverage information is received in a broadcast, in a manner similar to the above discussion of satellite ephemeris data.

Also, the ephemeris data can be broadcast, e.g., by system information such as the SIB or stored in the UE's internal storage or SIM. For instance, the ephemeris data, or at least a part of the ephemeris data, is received by the UE in a SIB or, alternatively, in RRC signaling. As another example, the UE may include a SIM interface, which, in operation, receives the ephemeris data, or a stored part of the ephemeris data, from a SIM storing the ephemeris data. The ephemeris data may be broadcasted in the system information in addition to the coverage area information or without the coverage area information (i.e., the coverage area information is stored in the UE/SIM). The ephemeris data may also include the coverage area information.

As described above, the satellite ephemeris data can be categorized into orbital plane parameters and satellite level parameters. For instance, the ephemeris data is broadcast to the UE via SIB. To reduce the broadcast overhead, the SIB can provide parameters which are related to a small number of neighboring satellites as satellites generating the candidate satellite beams.

The transceiver 1220 of the base station 1210 performing communication with the UE of the above-described embodiments, in operation, transmits, e.g., to UE 1260, coverage area information indicating a coverage area of at least one candidate satellite beam relative to a satellite location of at least one satellite generating, respectively, the at least one candidate satellite beam. The base station transceiver 1220, in operation, further receives, e.g., from UE 1260, a location report indicating a location of the UE 1260, or an indication of a target satellite beam out of the at least one candidate satellite beam and a switching timing for the UE to switch to the target satellite beam.

The base station circuitry 1280, in operation, determines the target satellite beam and the switching timing based on the received indication or based on the transmitted coverage area information, ephemeris data of the at least one satellite generating the at least one candidate satellite beam, and the location of the UE indicated by the received location report.

Further, the base station circuitry terminates communication over a source beam with the UE at the determined switching timing.

In the case of a handover, the base station terminates communication with the UE over the source serving beam, and the UE starts communication with another base station, the target base station, which serves the target cell over the target satellite beam. In the case of a beam switch within the same serving cell, the base station terminates communication with the UE over the source beam and starts communication with the UE over the target satellite beam.

For instance, the UE performs a handover to another base station, in which case the base station terminates communication with the UE and stops performing downlink transmissions and receiving uplink transmissions by the switching timing, e.g., before the switching timing or at the switching timing. Alternatively, e.g., if the target satellite beam is a serving beam of the same cell, the base station switches the UE from a source serving beam, over which the communication currently takes place, to the target serving beam. E.g., the base station terminates communication (uplink and downlink transmissions) with the UE on the source beam and starts communication with the UE on the target satellite beam.

Figure 16:
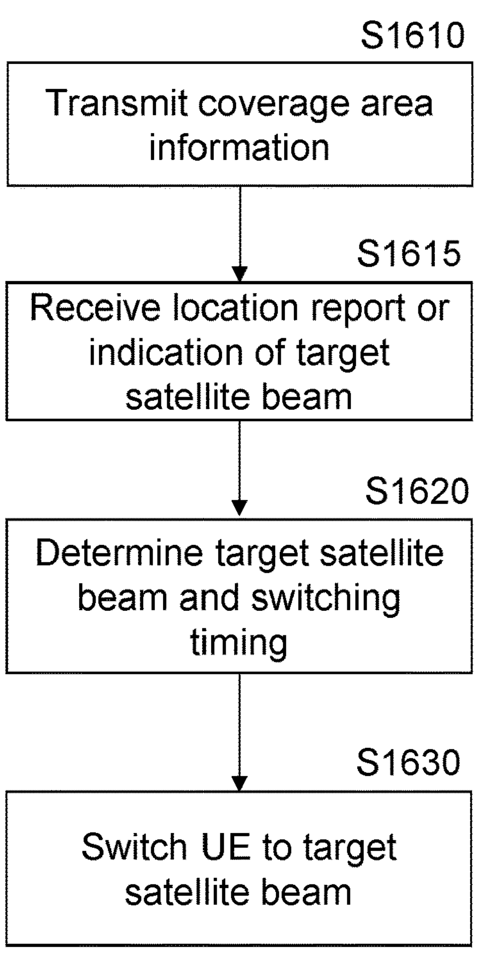
FIG. 16 is a block diagram showing steps of a communication method for a base station.

In correspondence with the foregoing description of the base station, provided is a communication method to be performed by a base station (or "base station method", for short), which is shown in FIG. 16. The method includes step S1610 of transmitting coverage area information indicating a coverage area of at least one candidate satellite beam relative to a satellite location of at least one satellite generating, respectively, the at least one candidate satellite beam. Further, the base station method includes a step S1615 of receiving a location report indicating a location of a user equipment, UE, or an indication of a target satellite beam out of the at least one candidate satellite beam and a switching timing for the UE to switch to the target satellite beam. The base station method further includes step S1620 determining target satellite beam and the switching timing. This determination of the target satellite beam and the switching timing is determined either based on the received indication or based on the transmitted coverage area information, ephemeris data of the at least one satellite generating the at least one candidate satellite beam, and the location of the UE indicated by the received location report. The base station method includes step S1630 of terminating communication with the UE over a source serving beam at the determined switching timing.

It should be noted that any embodiments and examples provided by the present disclosure are to be understood as referring to both base station and UE as well as to apparatus (e.g., base station or UE) as well as the method to be performed by the corresponding apparatus. For instance, the base station may transmit one or both of the coverage area information and the ephemeris data in system information or in RRC signaling, unless explicit declaration or the context indicates otherwise.

Further, as has been mentioned, a common understanding between UE and base station regarding switching of the satellite beam, e.g., of the target satellite beam and the switching timing, should be given when the UE is in CONNECTED mode.

However, the selection of the target satellite beam such as serving cell or beam need not be known to the base station for IDLE and INACTIVE UEs. When communicating with a UE in IDLE or INACTIVE mode, it may be sufficient for the base station to transmit the coverage area information (corresponding to step S1610 of FIG. 16) and possibly the ephemeris data. On the other hand, steps S1615 to S1630 may be omitted when the UE to be switched is in IDLE or INACTIVE mode. For this reason, the satellite beam and switching time determining circuitry 1427 and the satellite beam switching control circuitry S1235 are shown with dashed lines in FIG. 14.

In the above-described embodiments, a first scheme of the present disclosure is provided where the UE determines the target satellite beam for switching as well as the timing for switching based on coverage area information, ephemeris data, and a location of the UE, all three of which are available at the UE.

However, in addition to the above-described first scheme, the present disclosure provides a second scheme described in the following where the UE switches to a target satellite beam based on an indication of one or multiple satellite beams which are the target of switching, which is signaled to the UE.

Accordingly, in some embodiments, the UE transceiver 1270, in operation, transmits a location report indicating a location of the UE 1260, and receives UE specific signaling indicating at least one target satellite beam and at least one corresponding switching timing for switching to the at least one target satellite beam. The UE circuitry 1280, in operation, controls the transceiver to perform switching to at the least one target satellite beam at the at least one corresponding switching timing indicated in the UE-specific signaling.

Correspondingly the base station transceiver 1220, in operation, receives a location report indicating a location of a UE, and transmits UE-specific signaling indicating at least one target satellite beam and at least one corresponding switching timing for the UE to switch to the at least one target satellite beam. Therein, the at least one target satellite beam, which is a satellite beam out of at least one candidate satellite beam, and the at least one corresponding switching timing are determined (e.g., calculated and/or selected) by the base station circuitry 1230 based on coverage area information indicating a coverage area of the at least one candidate satellite beam relative to a satellite location of at least one satellite generating, respectively, the at least one candidate satellite beam, ephemeris data of the at least one satellite generating the at least one candidate satellite beam, and the location of the user equipment indicated in the received location report.

Figure 17:
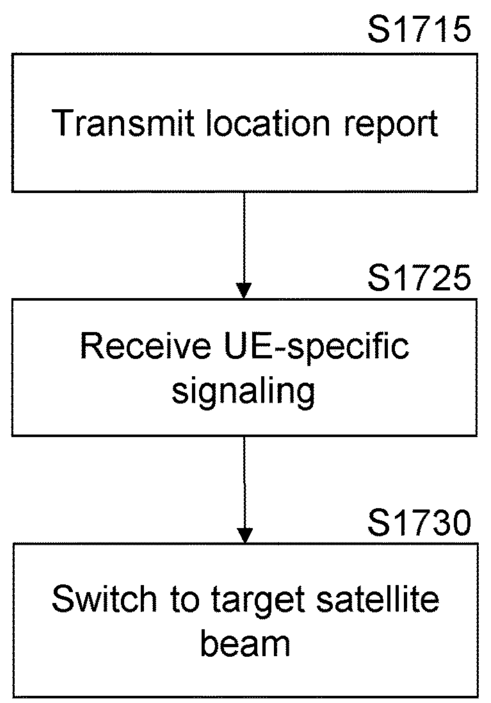
FIG. 17 is a block diagram showing steps of a communication method for a UE.
Figure 18:
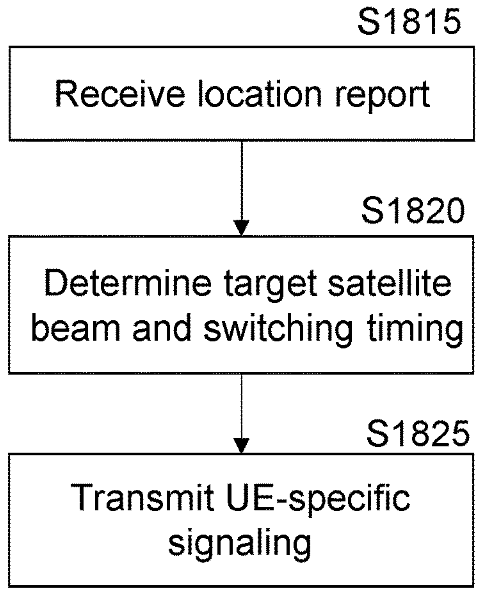
FIG. 18 is a block diagram showing steps of a communication method for a base station.

In correspondence with the above-disclosed base UE and base station of the second scheme, provided are embodiments of a communication method for a UE ("UE method") and a communication method for a base station (base station method), the steps of which are shown in FIGS. 17 and 18.

As can be seen in FIG. 17, the UE method includes step S1715 of transmitting a location report of the UE, which indicates the location of the UE. The UE method further includes step S1725 of receiving UE-specific signaling indicating at least one target satellite beam and at least one corresponding switching timing for switching to the at least one target satellite beam, and step S1730 of switching to the at least one target satellite beam at the at least one corresponding switching timing indicated in the UE-specific signaling.

As can be further seen in FIG. 18, the base station method includes step S1815 of receiving a location report indicating a location of a user equipment, UE. The base station method further includes step S1820 of determining, based on coverage area information indicating a coverage area of the at least one candidate satellite beam relative to a satellite location of at least one satellite generating, respectively, the at least one candidate satellite beam, ephemeris data of the at least one satellite generating the at least one candidate satellite beam, and the location of the user equipment indicated in the received location report, at least one target satellite beam and at least one corresponding switching timing for the UE to switch to the at least one target satellite beam out of the at least one candidate satellite beam. Further, the method includes step S1825 of transmitting UE-specific signaling indicating the at least one target satellite beam and the at least one corresponding switching timing for the UE to switch to the at least one target satellite beam.

In addition to the steps shown in FIG. 18, the base station method may include a step of terminating communication with the UE at the determined switching timing, e.g., switching the UE to another serving beam, e.g., by terminating communication on the source beam and starting communication on the target beam, which may include a beam of the same serving cell.

As described, in the second scheme, the UE is provided with UE-specific signaling indicating one or more target satellite beams and one or more switching timings. For instance, the UE is provided with a list of one or multiple serving cell(s) and/or serving beam(s) with associated execution timing (e.g., switching timing) after the UE reports its location (e.g., based on GNSS measurement). Based on the indication such as list of target satellite beams(s) and corresponding timing(s), the UE switches to the serving cell/beam at the indicated timing.

The base station, e.g., the gNB, may store the information on how the ground cell/beam area, e.g., the coverage area information, is defined, and the satellite ephemeris data (indicating how the satellite and, consequently, the ground cell/beam) is moving. After the UE reports its location, the gNB knows which ground cell/beam area will cover the UE location at which timing, and can determine the target satellite beam(s) for switching as well as the associated switching timing(s). For instance, for the UE-specific signaling to the target beams(s) and switching timing(s), UE-specific RRC signaling may be used.

For instance, the target satellite beam may be indicated by a cell ID (e.g., PCI) of the serving cell, if there is a one-to-one correspondence between satellite beam and serving cell. Further, for beam switch within a cell, the target satellite beam may be indicated e.g., by indicating, an SSB (Synchronization Signal Block) index.

In some examples, the UE-specific signaling indicates a plurality of target satellite beams and a plurality of corresponding switching timings. Accordingly, the UE-specific signaling may include a list, which comprises a plurality of entries. Each entry may comprise a target satellite beam (e.g., represented by one or both of a cell identity such as PCI and an indication of the beam) as well as a switching timing or execution timing for switching to the target satellite beam.

In the second scheme, by determining and providing a list of one or multiple target beams/cells as well as respectively associated switching timings, the base station is enabled to decide on a plan of future target cells/beams. For instance, if a plurality of target beams switching timings, the UE is enabled to perform a plurality of switches (handovers or beam switchings) without the need for a new indication of the next target beam or cell for each handover or switching process.

Figure 19:
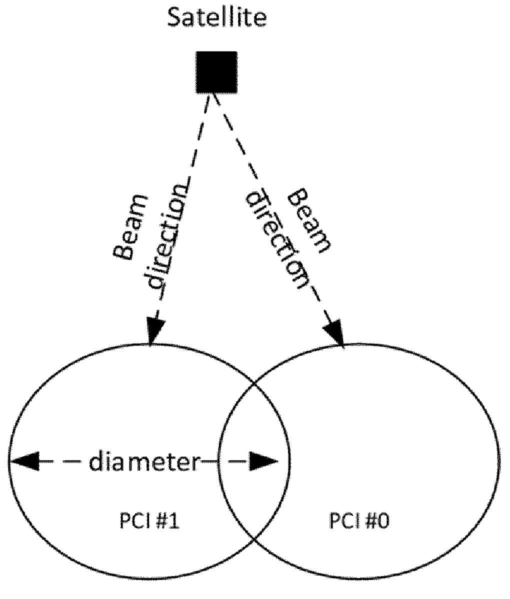
FIG. 19 illustrates a definition of satellite coverage by beam direction and diameter.
Figure 20:
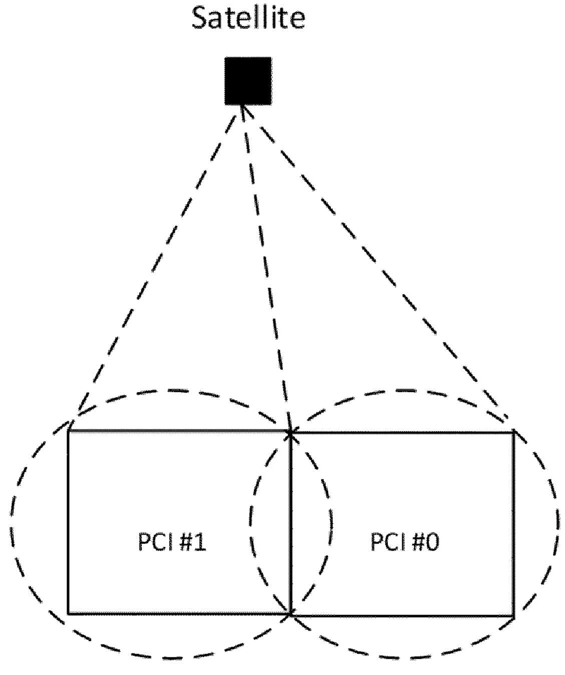
FIG. 20 illustrates a definition of satellite beam coverage by non-overlapping rectangular shapes.
Figure 21:
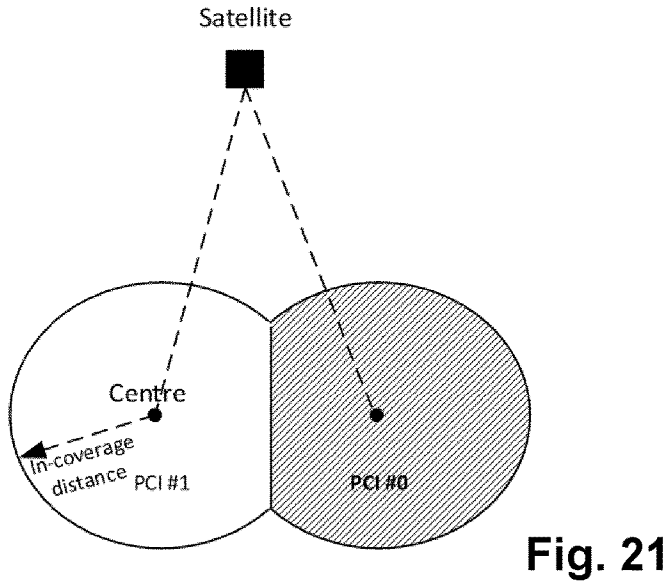
FIG. 21 illustrates a definition of satellite beam coverage by satellite beam center and in-coverage distance.

In the following, several examples will be provided on how the ground cell or beam area, which corresponds to a footprint coverage of the satellite beam on Earth, is defined, which are illustrated in FIGS. 19 to 21. The following embodiments and examples can be combined with the formerly described first scheme as well as with the second scheme.

As one option shown in FIG. 19, the coverage area information includes, for each of the at least one candidate satellite beam, a satellite beam direction and a radius or diameter of the coverage area, such as a radius or diameter on earth (e.g., a footprint coverage), which are provided possibly in addition to a PCI and/or SSB index for each candidate satellite beam.

The UE (in the first scheme) and/or base station (e.g., in the second scheme) may then select the satellite beam whose footprint covers the UE location.

A UE may be located in an overlapping area such as a coverage area of two neighboring satellite beams (e.g., cells or SSB beams), and the UE is then covered by multiple footprint coverages, e.g., two overlapping footprints shown in FIG. 19. In such case, the target satellite beam may be determined by a rule which is possibly based on a UE identifier. E.g., UEs having even IDs may be served by a satellite beam corresponding to a lower PCI and/or lower SSB index, and UEs having odd IDs may be served by a higher cell ID or SSB index, or vice versa. E.g., such a rule may be defined in a standard which may facilitate a balanced distribution of UEs among serving beams or cells.

In a second option shown in FIG. 20, the coverage area information includes a polygon defining the coverage area in a non-overlapping manner. For instance, each of the candidate satellite beams corresponds to a polygon or shape, wherein the polygons representing respectively different coverage areas are non-overlapping. For instance, the coverage area information may include a ground cell/beam area defined by a shape such as a rectangular or hexagonal shape, wherein the shapes are non-overlapping for the respectively different coverage areas. This information on the shape may be provided in addition to the PCIs and/or SSB indexes respectively corresponding to the candidate satellite beams. The UE (e.g., UE circuitry 1280) may then select the ground area which covers the UEs location as target satellite beam, e.g., serving cell or beam.

For example, the polygon may be indicated using a reference point (such as a corner or a center), which may be a position relative to the current satellite position available from the ephemeris data plus a side length of the polygon or different indication of the polygon size. As another example, the polygon may be indicated using coordinates of all corners of the polygon relative to the satellite position.

In accordance with this second option, since the shapes representing the coverage areas of different candidate satellite beams are non-overlapping, an additional rule, e.g., the rule based on the UE ID described above with regard to the first option, is not required.

In a third option, as shown in FIG. 21, the coverage area information includes a center and a radius of the coverage area information. The UE (or UE circuitry 1280) may then select the satellite beam whose center is nearest or closest, e.g., has the lowest distance, to the UE location, if the in-coverage distance, which may be the radius of the coverage area as shown in FIG. 21, is satisfied. Otherwise, if the in-coverage distance is not satisfied for any satellite beam or cell, the UE is out of coverage.

The third option of providing a center and a radius of the coverage area and the first option based on a satellite beam direction and a radius of the coverage area are somewhat similar regarding the parameters to be signaled. For instance, the same pairs of values may be signaled in both options since a beam center is derivable from a beam direction, and a radius is derivable from a diameter, or a radius may be provided in both options. Accordingly, the actual parameters that are signaled in the first and in the third option are exchangeable. However, a difference between the first option and the third option is that in the third option, the UE selects the satellite beam whose footprint center is closest to the UE location. Accordingly, an unambiguous determination of the target satellite beam can be obtained without an additional rule, such as the ID based rule described in connection with the first option. Further, in order to control the user distribution, a bias value can be added when UE calculates its distance from a beam center. Consequently, the line in FIG. 21 to separate two cells would not be in the middle (having an equal distance to the central points of both cells) anymore. Instead, it can be shifted towards a beam center in a desired manner based, e.g., on the bias value. For instance, the bias value may be chosen based on a population density or UE density in the cells.

The above definitions of the coverage area information in accordance with the first to third options can be provided with respect to the position of the satellite position, e.g., relative to the satellite location of the satellite (or satellites) generating the candidate satellite beam(s), which changes with time and which is derivable for a given point in time from the ephemeris data. With the movement of the satellite over time, the coverage area, e.g., its size, may also change in time. For instance, the size of the satellite beam area may be adjusted to the UE density or population density of the area covered by the satellite beam. Accordingly, when the satellite is moving over an earth area with a higher population density, the coverage area such as beam footprint or ground cell/beam area may shrink to provide smaller cells and thereby cope with the increased demand caused by a higher number of UEs that need to be served.

FIGS. 22 to 26 show some examples of details on signaling between UE and source and target base stations for the above-described second scheme where the target satellite beam(s) and switching timing are determined by the base station and indicated to the UE via signaling.

Figure 22:
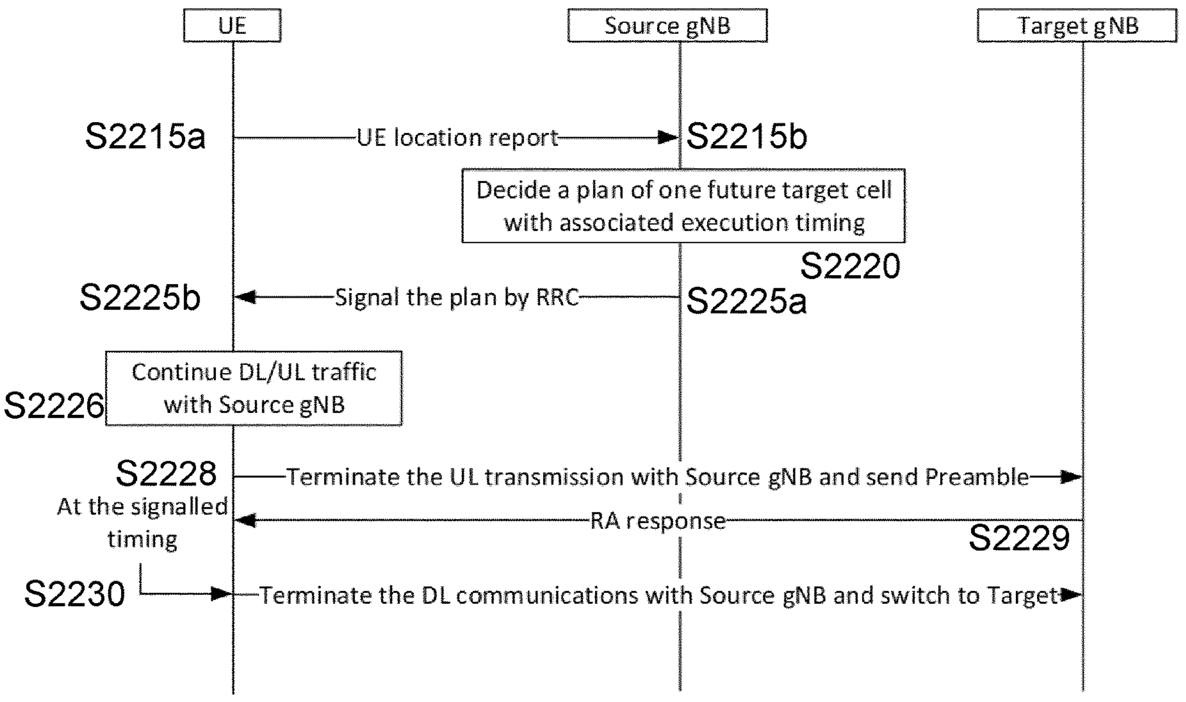
FIG. 22 illustrates signaling between UE and source and target base stations for RACH based handover.

FIG. 22 illustrates RACH based handover from a source base station to a target base station. Steps 2215*a* and 2225*b* correspond to steps S1715 and S1725 of the UE method shown in FIG. 17, and steps S2215*b* and S2225*a* correspond to steps S1815 and S1825 of the base station method shown in FIG. 18. Furthermore, in step S2220 which corresponds to step S1820 of the base station method, the base station decides a plan of one future target cell corresponding to a target satellite beam with and associated execution timing (e.g., switching timing), which the base station transmits to the UE by UE-specific RRC signaling.

After receiving the plan, the UE may still continue downlink and/or uplink traffic with the source base station (step S2226), before it performs the handover from the source base station to the target base station which serves the target cell via the target satellite beam. In particular, in step S2228, the UE terminates UL transmission with the source base station and sends a preamble to the target base station. The UE receives a random access response, which the target base station transmits in step S2229. Then, in step S2230, the UE terminates the downlink communications with the source base station and switches to the target base station serving the target cell. In the example shown in FIG. 22, the termination of downlink communications with the source base station is performed at the signaled switching timing.

In the example of RACH based handover shown in FIG. 22 the indicated switching timing is after the RAR (random access response corresponding to Message 2 (Msg 2) of the random access procedure). Accordingly, the UE starts transmission of the RACH preamble toward the target base station before the indicated execution timing or switching timing while keeping downlink reception from the source base station until the indicated switching timing.

Figure 23:
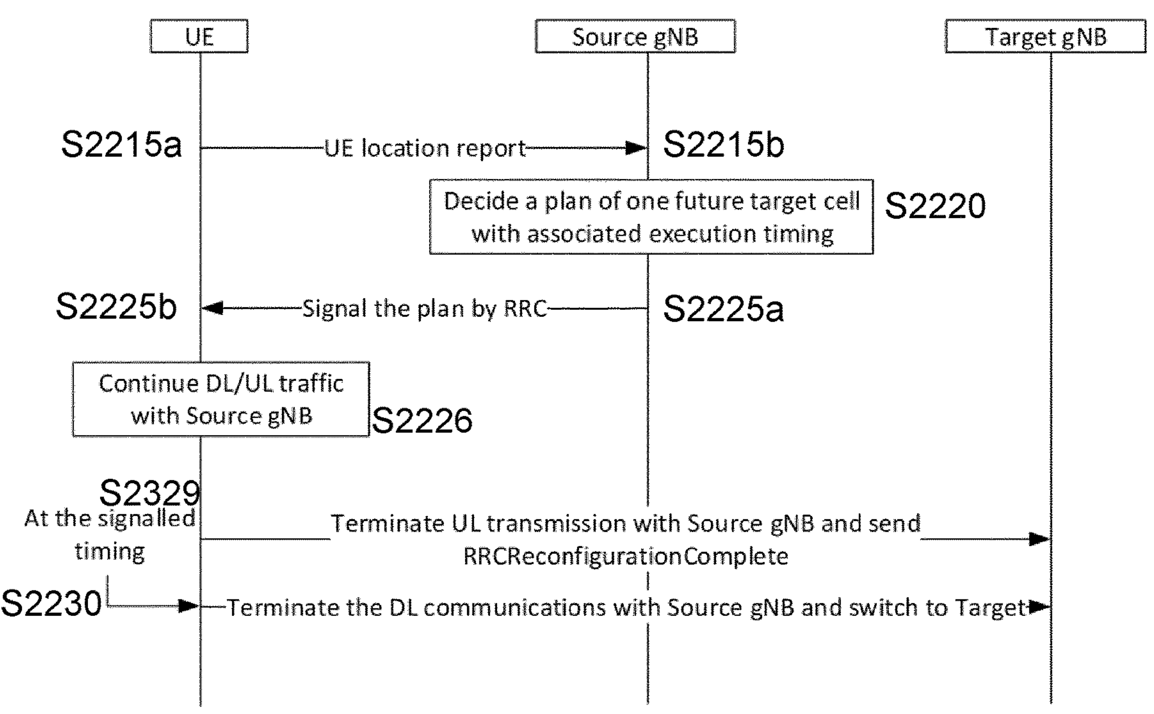
FIG. 23 illustrates signaling between UE and source and target base stations for RACH less handover.

An example of RACH-less handover, or handover without RACH, is shown in FIG. 23. Steps corresponding to the steps from FIG. 22 are indicated with the same reference signs. In step S2329, the UE terminates uplink transmissions with the source base station and sends an RRCReconfigurationComplete message to the target base station before the indicated timing.

Figure 24:
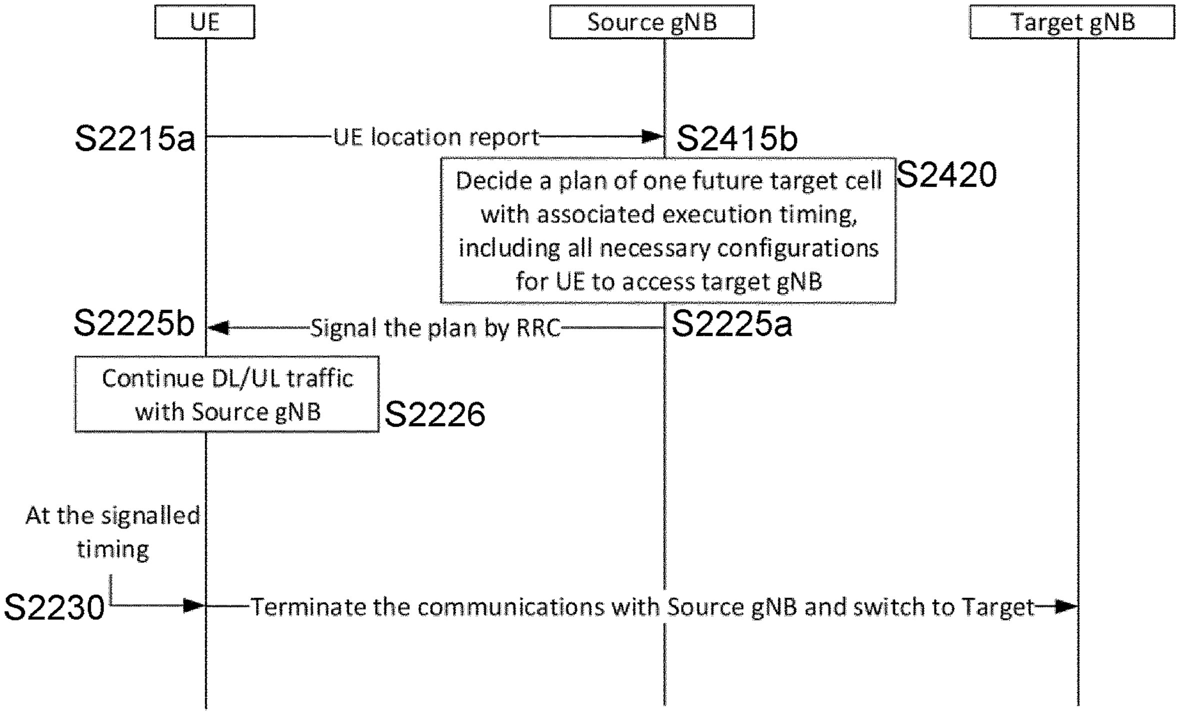
FIG. 24 illustrates signaling between LE and source and target base stations for handover without RRC reconfiguration signaling.

Another example of signaling between a UE and a base station for handover is shown in FIG. 24, where corresponding steps have the same reference numbers as in FIG. 23. As can be seen in FIG. 24, in step S2420 of deciding on the plan of the target cell, all necessary parameters for the handover to the target cell are configured in the plan, which is signaled by RRC. In the present example, no RRCReconfiguration signaling exchanged is involved during the handover, in contrast to the example from FIG. 23.

Figure 25:
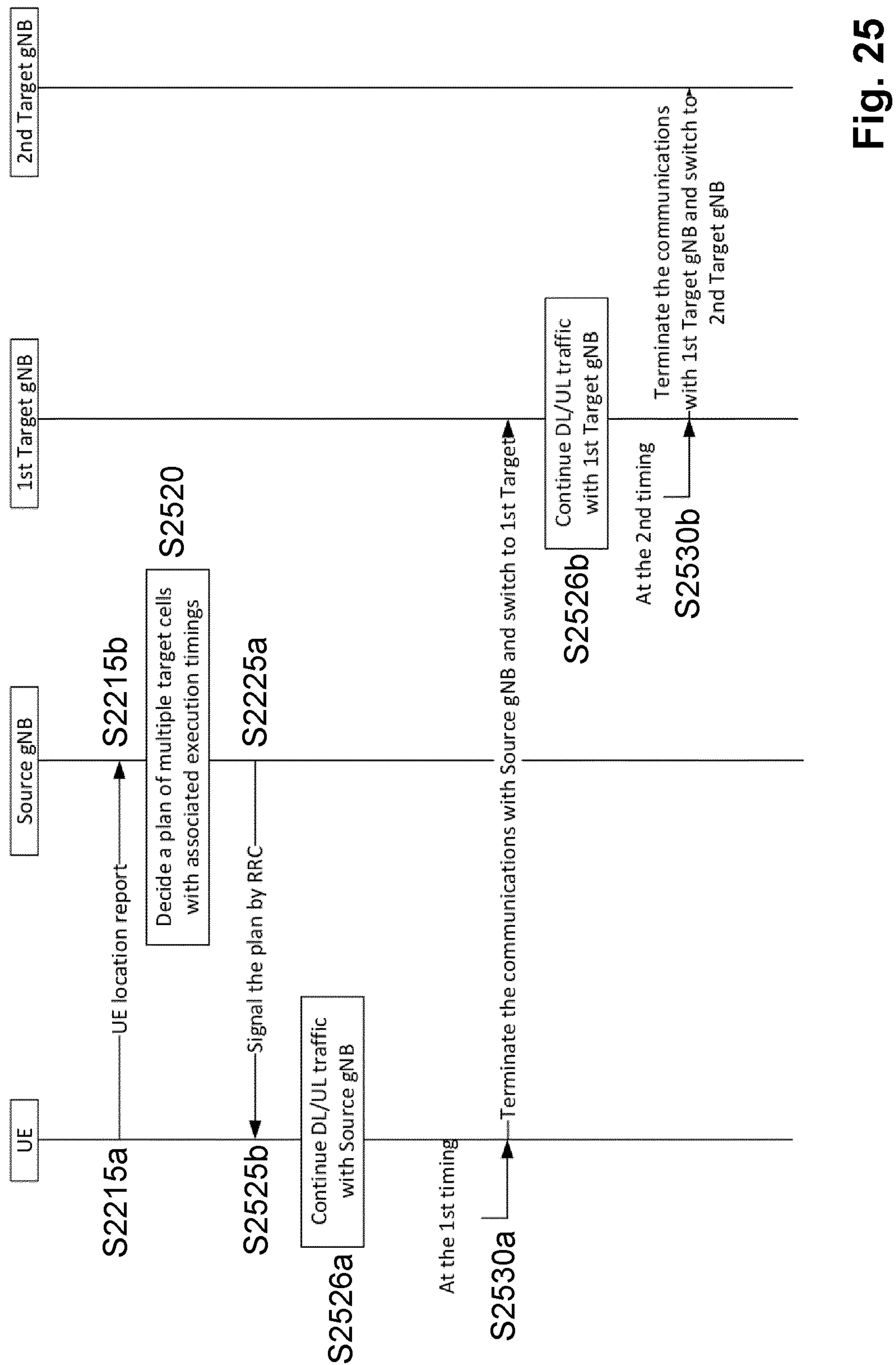
FIG. 25 illustrates signaling between a UE, a source base station and multiple target base stations for handover.

FIG. 25 shows an example where the base station, in step S2520, the base station decides on a plan of multiple target cells with associated execution (e.g., switching) timings and the UE-specific RRC signaling indicates a plurality of target satellite beams and associated corresponding switching timings. Like foregoing FIGS. 22 to 24, this example includes steps 2215*ab* and S2225*ab* of transmitting/receiving a UE location report. However, in the present example, the switching timings include a first switching timing at which the UE, in step S2530*a*, terminates (UL and DL) communication with the source base station and switches to a first target base station, and a second switching timing at which, in step 2530*b*, the UE then terminates communication with the first target base station and switches to the second target cell served by the second target base station. Before the switching, the UE performs communication with the source base station and, respectively, the first target base station (steps S2526*ab*).

Although the example from FIG. 25 shows a handover without RRCReconfiguration message exchanging, the case of signaling multiple target cells can also be applied to RACH based handover as well as RACH less handover with RRCReconfiguration message exchanging.

Figures 26, 27:
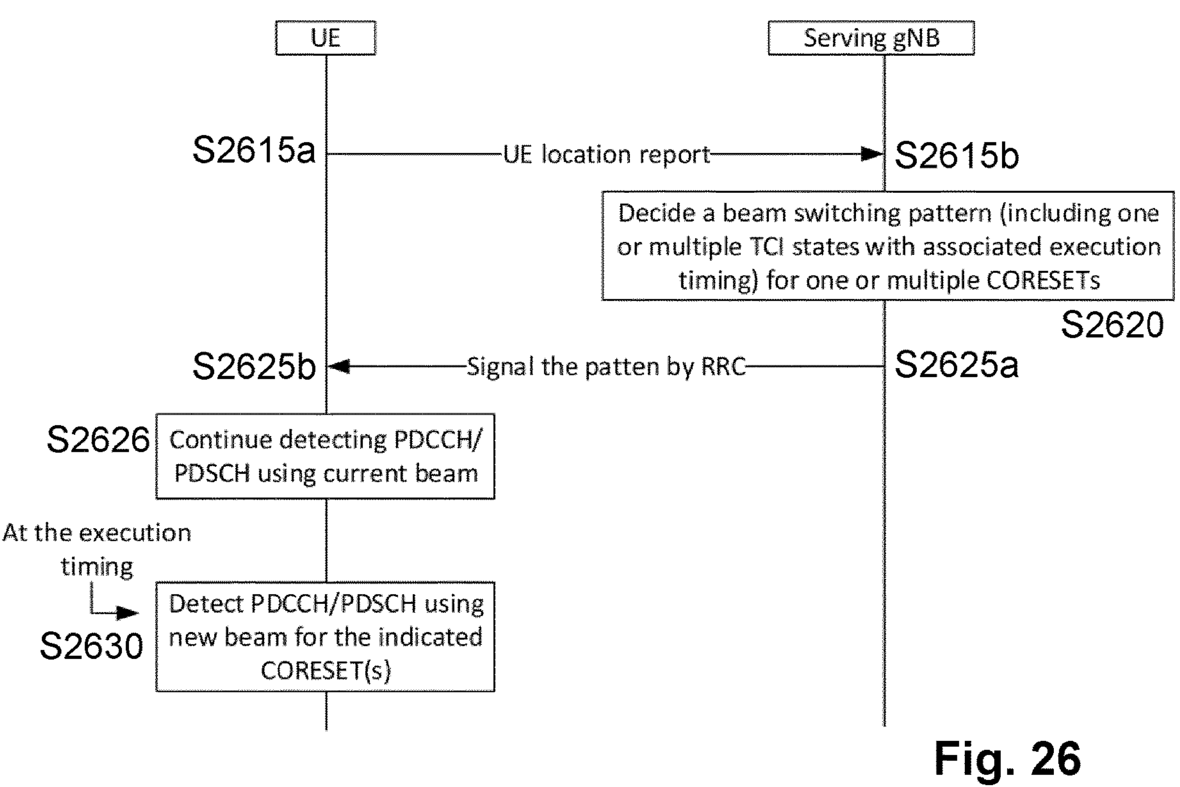
FIG. 26 shows signaling between a UE and a base station for beam switching.
FIG. 27 is a block diagram showing a user equipment.

While above-described FIGS. 22 to 25 illustrate the case of handover from a source cell to one or more target cell(s), FIG. 26 provides an example of signaling between a UE and a base station for beam switching among beams within the same serving cell.

After transmission/reception of the UE location report (step S2615*ab*), the base station, in the determining of the target satellite beam and target switching timing of step S2620, decides on a beam switching pattern for one or multiple CORESETS (Control Resource Sets). For instance, the beam switching pattern indicates one or more satellite beams as serving beams for beam switching. For instance, the beam switching pattern includes one or multiple TCI (Transmission Configuration Indication) states with associated execution timings. Each TCI state indicates one SSB index.

A CORESET is a set of (time and frequency) resources which the UE monitors for the PDCCH. A UE can be configured with multiple CORESETs in order to monitor different formats of downlink control information (DCI) over different time-frequency resources. One CORESET is associated with one beam (represented by a TCI state) for UE to monitor PDCCH. Therefore, for different CORESETs, the beams could be different. Hence, the beam switching pattern configured for different CORESET could be different. In case all CORESETs are always transmitted using the same beam, the same beam switching pattern can be configured for all CORESETs.

Further, the beam switching pattern can be configured for a sub-set of CORESETs configured for a UE, in order to achieve the tradeoff between flexibility and signaling overhead. For the CORESETs with beam switching pattern, beam switching is performed at the associated execution timing without involving further signaling overhead. Such scheme is expected to perform well in a LOS (Line of Sight) scenario where the beam with strongest signal strength is known from the location information. However, in a Non-LOS scenario, e.g., due to blockage caused by buildings or mountains, serving beam determination based on merely location information might not result in the strongest beam for the UE. To cope with such scenario, some CORESETs would not be configured with beam switching pattern. Then beam switching would be indicated dynamically, e.g., via a MAC CE (control element) as in Release 15 NR. Furthermore, a flag can be used in the CORESET configured with beam switching pattern to indicate enabling and disabling the configured beam switching pattern. If the beam switching pattern is enabled, the UE switches to the beams indicated by the pattern at the associated execution timings or switching timings. If the beam switching pattern is disabled, the beam switching may follow an indication in a MAC CE (Control element), as in Release 15 NR.

Before the execution timing, the UE detects a PDCCH and/or PDSCH using the current beam. At the execution timing, the UE starts detecting the PDCCH and/or PDSCH using the new beam or target beam for the indicated CORESET(s) (the CORESET(s) configured for the beam switching pattern).

As shown in the example of FIG. 26, a beam switching pattern is provided for downlink channels (PDCCH and PDSCH). The same beam switching pattern or separate beam switching pattern may be configured to be applied to uplink transmissions of PUCCH and PUSCH. In case that a separate uplink beam switching, e.g., a different pattern from a downlink switching pattern, SRI (spatial relationship indication) may be used to represent the uplink beam switching pattern instead of TCI, and the SRI may be provided in a PUCCH resource configuration.

In FIGS. 22 to 25, the "execution timing" or switching timing is defined as the timing where the UE terminates the DL communications with the source base station and switches to the target base station. However, in the present disclosure, the switching timing is not limited to this definition. There may be other definitions of a switching timing, at which other steps or operations of switching from a source cell/base station or target cell/base station are performed. For instance, the switching timing may be the timing of the transmission of a RACH preamble to the target cell (e.g., for RACH-based handover), or the timing of the transmission of the RRCReconfiguration message to the target cell (e.g., for RACH-less handover).

It is also possible that the switching timings are defined differently between UE and gNB. For example, the switching timing for UE is defined at the time of the transmission of a RACH preamble, but the switching timing for gNB is defined at the time of terminating the DL transmission.

Furthermore, in the RACH base handover shown, e.g., in FIG. 22, the indicated execution timing or, more generally, the switching timing which may determine by the UE and/or the base station), may take into account the maximum length of the RA response window and possible multiple trials of sending the RA preamble and monitoring the RA response. Accordingly, the UE may send a preamble and, if no response is successfully received, perform one or more further preamble transmission(s) until the maximum number of preambles is reached. If a RA response is nevertheless, despite the multiple trials, not received during this time window, the UE may declare handover failure and start the cell reselection procedure, e.g., as specified in NR Release 15 or 16.

Moreover, although not shown in FIG. 22, in RACH based handover, after sending the preamble, the UE may continue uplink communications to the source cell and then switch the uplink transmissions to the target cell at the time of sending a RRCConfigurationComplete message.

In the examples shown in FIGS. 22 to 26, the execution the plan for handover or the beam switching pattern is determined by the base station, in accordance with the above described second scheme. However, the first scheme where the target satellite beams(s) and the target execution timing are derived by the UE, may also be applied to any of RACH based handover, RACH free handover, and handover without exchange of RRC reconfiguration messages. In case of the first scheme, the execution timing is derived from the UE location area information in connection with the satellite ephemeris data.

Further, the UE may determine a single target satellite beam and associated switching timing as well as a plurality of target satellite beams and corresponding switching timings.

Moreover, the first scheme may be applied to beam switching, e.g., the UE selects a beam switching pattern based on the location, coverage area information, and ephemeris data, and indicates the beam switching pattern, possibly as a preferred beam switching pattern, to the base station.

The present disclosure describes switching to a target satellite beam. As mentioned, the target satellite beam, as well as each candidate satellite beam, may have a one-to-one correspondence with a serving cell (e.g., on the scenario of one satellite beam per cell shown in FIG. 9). Alternatively, e.g., in a scenario with multiple satellite beams per cell shown in FIG. 8, the target satellite beam may have a one-to-one correspondence with a synchronization signal block (SSB) index.

In accordance with the present disclosure, the target satellite beam and switching timing is determined based on a location or position of the UE, which may be a GNSS position. E.g., as shown in FIG. 27, in some embodiments, the UE 2760 comprises a GNSS module 2780 which, in operation determines the location of the UE by performing a GNSS measurement.

As described in the embodiments, the present disclosure provides a communication apparatus comprising a communication interface which, in operation, receives coverage area information indicating a coverage area of a candidate satellite beam relative to a satellite location of a satellite generating the candidate satellite beam or a location of a UE to be switched, and circuitry, which, in operation, determines, based on the coverage area information, ephemeris data of the satellite generating the candidate satellite beam, and the location of a UE to be switched, the candidate satellite beam to be a target satellite beam for switching and a switching timing for switching to the target satellite beam.

Further, the present disclosure provides a communication method to be performed by the communication apparatus described in the previous paragraph, comprising steps of receiving coverage area information and of determining a target satellite beam and a switching timing for switching.

For instance, in accordance with the embodiments and schemes of the present disclosure, the communication apparatus may be a user equipment (e.g., in the first scheme) or a base station (e.g., in the first or second scheme), or may be comprised by a user equipment or a base station. If the communication apparatus is a UE or is comprised by a UE, the location of the UE is a location of the communication apparatus, and if the communication apparatus is a base station or is comprised by a base station, the UE location received by a UE reporting the UE's location.

The present disclosure facilitates satellite beam switching including handover and switching of the serving beam. In particular, when target satellite beam is determined based on coverage area information, ephemeris data, and on the UE location, the need for performing frequent measuring and reporting of measurements may be alleviated. Further, when measurements need not be performed and reported or are performed and reported less frequently, the UE power consumption may be reduced. In addition, the need for the base station to select a target cell based on a received measurement report may be eliminated. Furthermore, it is possible to minimize the interruption of communication during handover. E.g., exchange of a handover request from the source base station to the target base station and an acknowledgement of the handover request may be skipped.

Moreover, the embodiments that are related to the above-described first scheme particularly provide a mechanism for determining a target satellite beam and for switching to the target satellite beam, which UEs in any of IDLE, INACTIVE, and CONNECTED states are able to apply. The way of determining the target satellite beam therefore is not dependent on the UE's current RRC state and does not need to be adapted to the specific states.

On the other hand, the second scheme may facilitate reducing the UE's processing workload since it is sufficient that the processing for selecting the target satellite beam using the UE location, the coverage area information, and the ephemeris data as input is performed by the base station. Further, since the UE does not need to receive coverage area information and/or ephemeris data for the satellite beam switching, signaling overhead may be reduced.

In some implementation of NTN communication, either one of the first scheme and the second scheme of the present disclosure may be selected. However, it is also possible to combine both the first and the second scheme.

One possibility is to use the IDLE and INACTIVE UEs use the first scheme and CONNECTED UEs use the second scheme, e.g., in a scenario where satellite beams for CONNECTED UEs are different from satellite beams for IDLE and INACTIVE UEs.

Another possibility of combining the first and the second scheme is to use the first scheme for handover between cells, and use the second scheme for beam management (which is also called "L1 (Layer 1) mobility management"). Such a combination may particularly be applied in connection with deployment option a (shown in FIG. 8 where one beam has multiple cells).

Further, for scenarios with a frequency reuse factor larger than 1, information on the bandwidth part used by each satellite beam may be included. The frequency use factor is equal to one if all cells or satellite beams use the same frequencies or bandwidth, whereas the frequency reuse factor is larger than one if different cells, such as neighboring cells, use different parts of the bandwidth.

Likewise, for scenarios with polarization reuse, information on the polarization of each satellite beam may be included.

The above mentioned inclusion of bandwidth and/or polarization information is possible for both the first and the second scheme. For instance, information on at least one of a polarization of each candidate satellite beam and the bandwidth part of each candidate satellite beam is included in the coverage area information.

The techniques of the present disclosure may facilitate communication in NTNs for instance in LOS (line of sight) scenarios, but are also applicable to NLOS (non-line of sight) scenarios. In order to facilitate for the UE to maintain communication over the strongest available beam or a sufficiently strong beam (e.g., a beam with the greatest or at least with a sufficient signal strength and/or quality), the techniques of the present disclosure may be combined with measurement-based schemes. Such combination of location based schemes and measurement-based schemes may be useful if serving cell or beam determination merely based on the location, coverage, and ephemeris information is not sufficient to result in a sufficiently strong beam for the UE, e.g., in an NLOS scenario.

As an example of such a combination, the techniques of the present disclosure for determining a target beam based on location, coverage, and ephemeris data are used to determine the target satellite beam and possibly, neighboring beams. After this selection, a measurement of the signal quality or strength of the selected target satellite beam may be performed. If the beam that has been selected using the disclosed techniques has a sufficient quality, e.g., RSRP (Reference Signal Received Power) or RSRQ (Reference Signal Received Quality) of the selected target satellite beam is larger than a threshold, the measurement of the signal strength and/or quality may be skipped or omitted for the neighboring satellite beams or cells.

E.g., the target satellite beam is generated by a LEO, MEO, or HEO satellite.

Moreover, the present disclosure is applicable to both cases of transparent satellite shown in FIG. 6 and regenerative satellite shown in FIG. 7. Additionally, the disclosed techniques may be applied to the communication systems that implement both terrestrial networks and non-terrestrial networks, e.g., for a handover from a base station having earth-based antennas to a NTN base station with transparent and/or regenerative satellites. E.g., the serving base station, such as the target base station generating the target satellite beam, and possibly the source base station, may be located on board of a satellite.

Moreover, although the present disclosure is directed to NTN communication, the disclosed techniques may be applied in terrestrial networks as well, e.g., in a high-speed scenario, provided that the UE is capable of deriving or determining its own location or moving trajectory for the first scheme or the base station is capable of determining or predicting the UE's location or moving trajectory for the second scheme. For instance, a target beam for switching, including a beam generated by a terrestrial antenna, may be determined based on the location or trajectory of the UE and coverage area information of the candidate beam(s).

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Provided is a user equipment, UE, comprising a transceiver, which, in operation, receives coverage area information indicating a coverage area of at least one candidate satellite beam relative to a satellite location of at least one satellite generating, respectively, the at least one candidate satellite beam; and circuitry, which, in operation, determines, based on the received coverage area information, ephemeris data of the at least one satellite generating the at least one candidate satellite beam, and a location of the user equipment, a target satellite beam for switching out of the at least one candidate satellite beam and a switching timing for switching to the target satellite beam, and controls the transceiver to perform switching to the determined target satellite beam at the determined switching timing.

For example, the coverage area information is received in system information.

In some embodiments, the ephemeris data is received in the system information.

In some embodiments, the UE further comprises a subscriber identity module, SIM, interface, which, in operation, receives the ephemeris data from a SIM storing the ephemeris data.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

In some embodiments, the transceiver, in operation, transmits a location report indicating the location of the UE or an indication of the determined target satellite beam and the determined switching timing.

In some embodiments, the target satellite beam has a one-to-one correspondence with a serving cell, or the target satellite beam has a one-to-one correspondence with a synchronization signal block, SSB, index.

Further provided is a base station, comprising a transceiver which, in operation, transmits coverage area information indicating a coverage area of at least one candidate satellite beam relative to a satellite location of at least one satellite generating, respectively, the at least one candidate satellite beam and receives a location report indicating a location of a user equipment, UE, or an indication of a target satellite beam out of the at least one candidate satellite beam and a switching timing for the UE to switch to the target satellite beam; and circuitry which, in operation, determines the target satellite beam and the switching timing based on the received indication or based on the transmitted coverage area information, ephemeris data of the at least one satellite generating the at least one candidate satellite beam, and the location of the UE indicated by the received location report, and terminates communication over a source serving beam with the UE at the determined switching timing.

In some embodiments, the transceiver, in operation, transmits the coverage area information in system information.

In some embodiments, the transceiver, in operation, transmits the ephemeris data in system information.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

For example, the target satellite beam has a one-to-one correspondence with a serving cell, or the target satellite beam has a one-to-one correspondence with a synchronization signal block, SSB, index.

Provided is a user equipment, UE, comprising a transceiver which, in operation, transmits a location report indicating a location of the UE, and receives UE-specific signaling indicating at least one target satellite beam and at least one corresponding switching timing for switching to the at least one target satellite beam; and circuitry, which, in operation, controls the transceiver to perform switching to the at least one target satellite beam at the at least one corresponding switching timing indicated in the UE-specific signaling.

In some embodiments, the UE-specific signaling indicates a plurality of target satellite beams and a plurality of corresponding switching timings.

In some embodiments, the target satellite beam has a one-to-one correspondence with a serving cell, or the target satellite beam has a one-to-one correspondence with a synchronization signal block, SSB, index.

Further provided is a base station, comprising a transceiver, which, in operation, receives a location report indicating a location of a user equipment, UE, and transmits UE-specific signaling indicating at least one target satellite beam and at least one corresponding switching timing for the UE to switch to the at least one target satellite beam; and circuitry, which, in operation, determines the at least one target satellite beam out of at least one candidate satellite beam and the at least one corresponding switching timing based on coverage area information indicating a coverage area of the at least one candidate satellite beam relative to a satellite location of at least one satellite generating, respectively, the at least one candidate satellite beam, ephemeris data of the at least one satellite generating the at least one candidate satellite beam, and the location of the user equipment indicated in the received location report.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

In some embodiments, the target satellite beam has a one-to-one correspondence with a serving cell, or the target satellite beam has a one-to-one correspondence with a synchronization signal block, SSB, index.

Further provided is a communication method, comprising the following steps to be performed by a user equipment, UE: receiving coverage area information indicating a coverage area of at least one candidate satellite beam relative to a satellite location of at least one satellite generating, respectively, the at least one candidate satellite beam; determining, based on the received coverage area information, ephemeris data of the at least one satellite generating the at least one candidate satellite beam, and a location of the UE, a target satellite beam for switching out of the at least one candidate satellite beam and a switching timing for switching to the target satellite beam; and performing switching to the determined target satellite beam at the determined switching timing.

For example, the coverage area information is received in system information.

In some embodiments, the ephemeris data is received in the system information.

In some embodiments, the ephemeris data is from a subscriber identity module, SIM, storing the ephemeris data.

In some embodiments, the method includes transmitting a location report indicating the location of the UE or an indication of the determined target satellite beam and the determined switching timing.

In some embodiments, the target satellite beam has a one-to-one correspondence with a serving cell, or the target satellite beam has a one-to-one correspondence with a synchronization signal block, SSB, index.

Further provided is a communication method, comprising the following steps to be performed by a base station: transmitting coverage area information indicating a coverage area of at least one candidate satellite beam relative to a satellite location of at least one satellite generating, respectively, the at least one candidate satellite beam; receiving a location report indicating a location of a user equipment, UE, or an indication of a target satellite beam out of the at least one candidate satellite beam and a switching timing for the UE to switch to the target satellite beam; determining the target satellite beam and the switching timing based on the received indication or based on the transmitted coverage area information, ephemeris data of the at least one satellite generating the at least one candidate satellite beam, and the location of the UE indicated by the received location report; and terminating communication over a source serving beam with the UE at the determined switching timing.

In some embodiments, the coverage area information is transmitted in system information.

In some embodiments, the ephemeris data is transmitted in system information.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

For example, the target satellite beam has a one-to-one correspondence with a serving cell, or the target satellite beam has a one-to-one correspondence with a synchronization signal block, SSB, index.

Provided is a communication method, comprising the following steps to be performed by a user equipment, UE: transmitting a location report indicating a location of the UE; receiving UE-specific signaling indicating at least one target satellite beam and at least one corresponding switching timing for switching to the at least one target satellite beam; and performing switching to the at least one target satellite beam at the at least one corresponding switching timing indicated in the UE-specific signaling.

In some embodiments, the UE-specific signaling indicates a plurality of target satellite beams and a plurality of corresponding switching timings.

In some embodiments, the target satellite beam has a one-to-one correspondence with a serving cell, or the target satellite beam has a one-to-one correspondence with a synchronization signal block, SSB, index.

Also provided is a communication method, comprising the following steps to be performed by a base station: receiving a location report indicating a location of a user equipment, UE; determining, based on coverage area information indicating a coverage area of the at least one candidate satellite beam relative to a satellite location of at least one satellite generating, respectively, the at least one candidate satellite beam, ephemeris data of the at least one satellite generating the at least one candidate satellite beam, and the location of the user equipment indicated in the received location report, at least one target satellite beam and at least one corresponding switching timing for the UE to switch to the at least one target satellite beam out of the at least one candidate satellite beam; and transmitting UE-specific signaling indicating the at least one target satellite beam and the at least one corresponding switching timing for the UE to switch to the at least one target satellite beam.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

In some embodiments, the target satellite beam has a one-to-one correspondence with a serving cell, or the target satellite beam has a one-to-one correspondence with a synchronization signal block, SSB, index.

Further provided is an integrated circuit, which, in operation, controls a user equipment, UE, for use in wireless communication to perform: receiving coverage area information indicating a coverage area of at least one candidate satellite beam relative to a satellite location of at least one satellite generating, respectively, the at least one candidate satellite beam; determining, based on the received coverage area information, ephemeris data of the at least one satellite generating the at least one candidate satellite beam, and a location of the UE, a target satellite beam for switching out of the at least one candidate satellite beam and a switching timing for switching to the target satellite beam; and performing switching to the determined target satellite beam at the determined switching timing.

For example, the coverage area information is received in system information.

In some embodiments, the ephemeris data is received in the system information.

In some embodiments, the ephemeris data is from a subscriber identity module, SIM, storing the ephemeris data.

In some embodiments, the integrated circuit controls the UE to perform transmitting a location report indicating the location of the UE or an indication of the determined target satellite beam and the determined switching timing.

In some embodiments, the target satellite beam has a one-to-one correspondence with a serving cell, or the target satellite beam has a one-to-one correspondence with a synchronization signal block, SSB, index.

Further provided is an integrated circuit, which, in operation, controls a base station for use in wireless communication to perform: transmitting coverage area information indicating a coverage area of at least one candidate satellite beam relative to a satellite location of at least one satellite generating, respectively, the at least one candidate satellite beam; receiving a location report indicating a location of a user equipment, UE, or an indication of a target satellite beam out of the at least one candidate satellite beam and a switching timing for the UE to switch to the target satellite beam; determining the target satellite beam and the switching timing based on the received indication or based on the transmitted coverage area information, ephemeris data of the at least one satellite generating the at least one candidate satellite beam, and the location of the UE indicated by the received location report; and terminating communication over a source serving beam with the UE at the determined switching timing.

In some embodiments, the coverage area information is transmitted in system information.

In some embodiments, the ephemeris data is transmitted in system information.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

For example, the target satellite beam has a one-to-one correspondence with a serving cell, or the target satellite beam has a one-to-one correspondence with a synchronization signal block, SSB, index.

Further provided is an integrated circuit, which, in operation, controls a user equipment, UE, for use in wireless communication to perform: transmitting a location report indicating a location of the UE; receiving UE-specific signaling indicating at least one target satellite beam and at least one corresponding switching timing for switching to the at least one target satellite beam; and performing switching to the at least one target satellite beam at the at least one corresponding switching timing indicated in the UE-specific signaling.

In some embodiments, the UE-specific signaling indicates a plurality of target satellite beams and a plurality of corresponding switching timings.

In some embodiments, the target satellite beam has a one-to-one correspondence with a serving cell, or the target satellite beam has a one-to-one correspondence with a synchronization signal block, SSB, index.

Further provided is an integrated circuit, which, in operation, controls a base station for use in wireless communication to perform: receiving a location report indicating a location of a user equipment, UE; determining, based on coverage area information indicating a coverage area of the at least one candidate satellite beam relative to a satellite location of at least one satellite generating, respectively, the at least one candidate satellite beam, ephemeris data of the at least one satellite generating the at least one candidate satellite beam, and the location of the user equipment indicated in the received location report, at least one target satellite beam and at least one corresponding switching timing for the UE to switch to the at least one target satellite beam out of the at least one candidate satellite beam; and transmitting UE-specific signaling indicating the at least one target satellite beam and the at least one corresponding switching timing for the UE to switch to the at least one target satellite beam.

For instance, the coverage area information includes, for each of the at least one candidate satellite beam, a satellite beam direction and a radius or diameter of the coverage area, or a polygon defining the coverage area in a non-overlapping manner, or a center and a radius of the coverage area.

In some embodiments, the target satellite beam has a one-to-one correspondence with a serving cell, or the target satellite beam has a one-to-one correspondence with a synchronization signal block, SSB, index.

Summarizing, the techniques disclosed herein feature a user equipment (UE), a base station, and methods for a UE and a base station. The UE comprises a transceiver which, in operation receives coverage area information indicating a coverage area of at least one candidate satellite beam relative to a satellite location of at least one satellite generating, respectively, the at least one candidate satellite beam; and circuitry which, in operation, determines, based on the received coverage area information, ephemeris data of the at least one satellite generating the at least one candidate satellite beam, and a location of the user equipment, a target satellite beam for switching out of the at least one candidate satellite beam and a switching timing for switching to the target satellite beam, and controls the transceiver to perform switching to the determined target satellite beam at the determined switching timing.

The invention claimed is:

1. A communication apparatus, comprising:

a transceiver, which, in operation, receives area information indicating an area at least one candidate satellite beam covers; and circuitry, which, in operation:

determines whether the communication apparatus is in the area the at least one candidate satellite beam covers based on the area information, and a location of the communication apparatus; and in response to the determination, performs a measurement of a signal quality or a signal strength of the at least one candidate satellite beam, wherein, the area information includes, for each of the at least one candidate satellite beam:

a satellite beam direction; and a center and a radius of the coverage area; and a target satellite beam of the at least one candidate satellite beam has a one-to-one correspondence with a serving cell.

2. The communication apparatus according to claim 1, wherein the area information is received in system information.

3. The communication apparatus according to claim 1, wherein the area information includes, for each of the at least one candidate satellite beam:

a polygon defining the coverage area in a non-overlapping manner.

4. The communication apparatus according to claim 1, wherein the transceiver, in operation, transmits a location report indicating the location of the communication apparatus or an indication of a target satellite beam of the at least one candidate satellite beam.

5. A method, comprising:

receiving area information indicating an area at least one candidate satellite beam covers;

determining whether the communication apparatus is in the area the at least one candidate satellite beam covers based on the area information, and a location of the communication apparatus; and in response to the determination, performing a measurement of a signal quality or a signal strength of the at least one candidate satellite beam, wherein the area information includes, for each of the at least one candidate satellite beam:

a satellite beam direction; and a center and a radius of the coverage area, and a target satellite beam of the at least one candidate satellite beam has a one-to-one correspondence with a serving cell.

6. An integrated circuit, which comprises circuitry configured to:

control receiving area information indicating an area at least one candidate satellite beam covers;

control determining whether the communication apparatus is in the area the at least one candidate satellite beam covers based on the area information, and a location of the communication apparatus; and in response to the determination, control performing a measurement of a signal quality or a signal strength of the at least one candidate satellite beam, wherein, the area information includes, for each of the at least one candidate satellite beam:

a satellite beam direction; and a center and a radius of the coverage area, and a target satellite beam of the at least one candidate satellite beam has a one-to-one correspondence with a serving cell.

* * * * *